(12) United States Patent
Chilton

(10) Patent No.: US 6,623,177 B1
(45) Date of Patent: Sep. 23, 2003

(54) SYSTEMS AND METHODS FOR PROVIDING FIBER OPTIC COMMUNICATIONS BETWEEN CIRCUIT BOARDS

(75) Inventor: Kendell A. Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/901,534

(22) Filed: Jul. 9, 2001

(51) Int. Cl.[7] .............................. G02B 6/36; G02B 6/12; G02B 6/00
(52) U.S. Cl. .............................. 385/88; 385/14; 385/53; 385/134; 385/135
(58) Field of Search .......................... 385/14, 134, 135, 385/53

(56) References Cited

U.S. PATENT DOCUMENTS

| | | | |
|---|---|---|---|
| 4,158,476 A | 6/1979 | McCartney | 351/96.21 |
| 4,258,977 A | 3/1981 | Lukas et al. | 350/96.21 |
| 4,613,105 A | 9/1986 | Genequand et al. | 248/178 |
| 4,904,036 A * | 2/1990 | Blonder | 385/14 |
| 5,073,000 A * | 12/1991 | Derfiny | 385/14 |
| 5,082,344 A | 1/1992 | Mulholland et al. | 385/60 |
| 5,123,073 A | 6/1992 | Pimpinella | 385/59 |
| 5,204,925 A | 4/1993 | Bonanni et al. | 385/89 |
| 5,257,332 A | 10/1993 | Pimpinella | 385/59 |
| 5,283,851 A * | 2/1994 | Vergnolle | 385/134 |
| 5,394,503 A | 2/1995 | Dietz et al. | 385/134 |
| 5,425,831 A | 6/1995 | Grimes et al. | 156/178 |
| 5,513,293 A * | 4/1996 | Holland et al. | 385/134 |
| 5,598,494 A | 1/1997 | Behrmann et al. | 385/59 |
| 5,778,123 A | 7/1998 | Hagan et al. | 385/76 |
| 5,838,856 A | 11/1998 | Lee | 385/54 |
| 5,845,028 A | 12/1998 | Smith et al. | 385/59 |
| 5,920,670 A | 7/1999 | Lee et al. | 385/78 |
| 6,005,991 A * | 12/1999 | Knasel | 385/114 |
| 6,041,652 A * | 3/2000 | Stewart | 73/504.04 |
| 6,233,376 B1 * | 5/2001 | Updegrove | 385/135 |
| 6,259,840 B1 * | 7/2001 | Munoz-Bustamante et al. | 385/14 |
| 6,270,262 B1 * | 8/2001 | Hudgins et al. | 361/699 |
| 6,304,690 B1 * | 10/2001 | Day | 385/134 |
| 6,305,848 B1 * | 10/2001 | Gregory | 385/134 |
| 6,419,399 B1 * | 7/2002 | Loder et al. | 385/53 |

FOREIGN PATENT DOCUMENTS

| | | | |
|---|---|---|---|
| EP | 0813 083 A1 | 12/1997 | G02B/6/43 |
| WO | WO 99/13367 | 3/1999 | G02B/6/26 |

* cited by examiner

*Primary Examiner*—Brian Healy
*Assistant Examiner*—Tina M Lin
(74) *Attorney, Agent, or Firm*—Chapin & Huang, L.L.C.; David E. Huang, Esq.

(57) ABSTRACT

An electronic system having a set of circuit boards and an interconnect. Each of the set of circuit boards includes a set of fiber optic circuit board connectors. The interconnect includes (i) a first planar member, (ii) a second planar member that is substantially parallel to the first planar member, and (iii) a set of fiber optic cable assemblies. Each fiber optic cable assembly includes a fiber optic cable segment, a first fiber optic interconnect connector which fastens to one end of that fiber optic cable segment and a second fiber optic interconnect connector which fastens to another end of that fiber optic cable segment. Each fiber optic interconnect connector extends through a hole defined by one of the first and second planar members. Furthermore, each fiber optic interconnect connector is configured to engage with a fiber optic circuit board connector.

35 Claims, 14 Drawing Sheets

SYSTEMS AND METHODS FOR PROVIDING FIBER OPTIC COMMUNICATIONS BETWEEN CIRCUIT BOARDS

BACKGROUND OF THE INVENTION

A fiber optic cable assembly is a device that carries a light signal from one end to another. A typical fiber optic cable assembly includes a segment of fiber optic cable, a first fiber optic connector that connects to one end of the fiber optic cable segment, and a second fiber optic connector that connects to another end of the fiber optic cable segment. The fiber optic connectors of the fiber optic cable assembly typically connect with other fiber optic connectors or adaptors in a male/female configuration, or in a snap fit manner using sets of matching bumps and holes. Some fiber optic connectors further include alignment posts to ensure proper alignment of fiber ends.

Fiber optic cable assemblies are commonly used to connect data communications equipment.together, and are available in an assortment of standard lengths. For example, fiber optic cable assemblies having long lengths of fiber optic cable segments can be laid out to enable high-speed communications over extremely long distances, e.g., in a wide area network (WAN), in an oversees telephone network, etc. As another example, some fiber optic cable assemblies, which are typically not as long, can run along walls and ceilings of a building to connect computers together in a local area network (LAN). As yet another example, some fiber optic cable assemblies (called patch cords), which have relatively short fiber optic cable segments, can operate as jumper cables and plug into an exposed rack-mounted set of data communications devices called a patch panel in order to provide a centrally located set of connections in a switchboard-like manner. Such data communications devices typically have their own housings and provide sets of external ports into which a person (e.g., a network administrator) can manually plug the fiber optic connectors of the fiber optic cable assemblies. As such, the patch panel is typically located in a computer room or in a locked utility closet in order to prevent tampering and/or to protect against an unauthorized person inadvertently knocking a cable loose and re-plugging that cable into an incorrect port.

The fiber optic cable segments of some fiber optic cable assemblies have a thin single fiber, i.e., a single mode fiber, and are suited for carrying a single light signal. Others have a relatively larger single fiber, i.e., a multimode fiber, and are suited for concurrently carrying multiple light signals, each light signal having a slightly different reflection angle within the fiber. Some fiber optic cable segments have multiple fibers for carrying multiple light signals.

Some fiber optic cable assemblies have specially configured connectors or additional fittings (e.g., elbows or sheathings) that provide particular bend radii to the fiber optic cable segments over particular lengths (e.g., a 90 degree bend over a 1.5 inch span). Such connectors and fittings attempt to prevent the fiber optic cable segments from overbending, i.e., from being moved into a position that can result in excessive light energy loss and/or permanent disfiguration of the fiber.

SUMMARY OF THE INVENTION

Unfortunately, there are deficiencies to the above-described fiber optic connecting approaches. In particular, none of the above-described fiber optic connecting approaches are well-suited for connecting multiple electronic circuit boards together in a relatively small footprint (e.g., within a single electronic equipment cabinet) to enable the circuit boards to communicate with each other. Although patch cords are suitable for connecting rack-mounted patch panel data communications devices together, patch cords alone are not well-suited for connecting circuit boards together. For example, a typical circuit board can exchange over a hundred signals with an external device (e.g., typically through a backplane that carries electrical signals). This quantity of signals makes the job of manually connecting fiber optic cables between several circuit boards an arduous and almost impractical task. Additionally, the resulting set of installed cable assemblies, which can quickly look like an overwhelming tangled web of cables, would tend to block air flow around the circuit boards thus preventing the circuit boards from receiving adequate cooling. Furthermore, replacement of a circuit board would become an extremely time consuming and tedious endeavor since fiber optic cable assemblies would need to be accurately and delicately removed from the old circuit board and plugged into the new circuit board. Moreover, even if a person were to achieve plugging in fiber optic cable assemblies to tie all the circuit boards together, there is a lack of control over who can later access and change/move the fiber optic cable assemblies, which is handled today for patch panels by locating the patch panels in a computer room or closet with restricted access.

In contrast to the above-described conventional fiber optic connecting approaches, an embodiment of the invention is directed to techniques for connecting circuit boards together using an interconnect which includes two planar members and a set of fiber optic cable assemblies having fiber optic connectors which extend through holes in the planar members. Accordingly, the circuit boards can engage with the interconnect (and thus communicate with each other through the interconnect) in a manner that enables them to easily install onto and de-install from the interconnect (e.g., during replacement). Additionally, the fiber optic cable assemblies can be positioned relative to the planar members such that there is no interference with an air flow that cools the circuit boards, and no opportunity for tampering or inadvertently modifying the interconnect.

One arrangement of the invention is directed to an electronic system having a set of circuit boards and an interconnect. Each of the set of circuit boards includes a set of fiber optic circuit board connectors. The interconnect includes (i) a first planar member, (ii) a second planar member that is substantially parallel to the first planar member, and (iii) a set of fiber optic cable assemblies. Each fiber optic cable assembly includes a fiber optic cable segment, a first fiber optic interconnect connector which fastens to one end of that fiber optic cable segment and a second fiber optic interconnect connector which fastens to another end of that fiber optic cable segment. Each fiber optic interconnect connector extends through a hole defined by one of the first and second planar members. Furthermore, each fiber optic interconnect connector is configured to engage with a fiber optic circuit board connector. This arrangement provides a well-organized and controlled configuration of fiber optic pathways between circuit boards.

In one arrangement, each of the set of circuit boards further includes a section of circuit board material, a set of integrated circuits mounted to the section of circuit board material, and a set of fiber optic transceivers mounted to the section of circuit board material and coupled to the set of fiber optic circuit board connectors. The set of fiber optic transceivers are in electrical communication with the set of integrated circuits. Additionally, each fiber optic circuit board connector has (i) a base portion which is rigidly disposed relative to the section of circuit board material, (ii) a connecting portion which is capable of moving relative to the section of circuit board material, and (iii) a resilient portion disposed between the base portion and the connecting portion of that fiber optic circuit board connector.

In one arrangement, the fiber optic cable segment of each fiber optic cable assembly of the set of fiber optic cable assemblies has a same length. Accordingly, the fiber optic signals passing through the set of fiber optic cable assemblies are single mode signals, the signals will essentially have the same delays.

In one arrangement, the first and second fiber optic interconnect connectors of each fiber optic cable assembly have sides which taper toward each other in a trapezoidal manner. Preferably, interconnect connectors have tapering sides on all four sides rather than just two sides. Accordingly, the circuit board connectors self-align with their corresponding interconnect connectors.

In one arrangement, interconnect further includes a set of standoffs which position the first and second planar members such that the first and second planar members are substantially parallel to each other. The standoffs facilitate positioning of the planar members relative to each other, and prevent the planar members from moving too close to each other where they could otherwise squish and damage the fiber optic cable segments. In another arrangement, each fiber optic interconnect connector defines a connecting portion and a standoff portion such that the connecting portion of that fiber optic interconnect connector contacts one of the first and second planar members and the standoff portion of that fiber optic interconnect connector contacts the other of the first and second planar members.

In one arrangement, the interconnect further includes a vacuum injected medium disposed within an interconnect inner region defined by the first and second planar members. The vacuum injected medium holds the fiber optic cable segment and first and second fiber optic connectors of each fiber optic cable assembly of the set of fiber optic cable assemblies in place. Preferably, the vacuum injected medium prevents tampering or manipulating of the fiber optic cable assemblies.

In one arrangement, the interconnect further includes a set of electrical conductors which extend along at least one of the first and second planar members. Accordingly, the interconnect can be used for providing electrical signals (e.g., power supply signals, circuit board presence indicator signals, etc.) to the circuit boards in addition to fiber optic signals.

The features of the invention, as described above, may be employed in electronic systems, devices and procedures as well as other components such as those of EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for connecting circuit boards together using an interconnect that provides fiber optic pathways. The interconnect (e.g., a fiber optic backplane) includes two planar members and a set of fiber optic cable assemblies having fiber optic connectors which extend through holes in the planar members. Accordingly, the circuit boards can connect with and communicate with each other through the interconnect in a manner that enables them to easily install onto and de-install from the interconnect (e.g., during initial installation, replacement, etc.). Additionally, the fiber optic cable assemblies can be positioned relative to the planar members such that there is no interference with an air stream that cools the circuit boards, and such that there is little or no opportunity for tampering or inadvertently modifying the configuration of fiber optic pathways. Furthermore, such positioning of the cable assemblies avoids the opportunity for cables to get damaged or caught on something.

Figure 1:
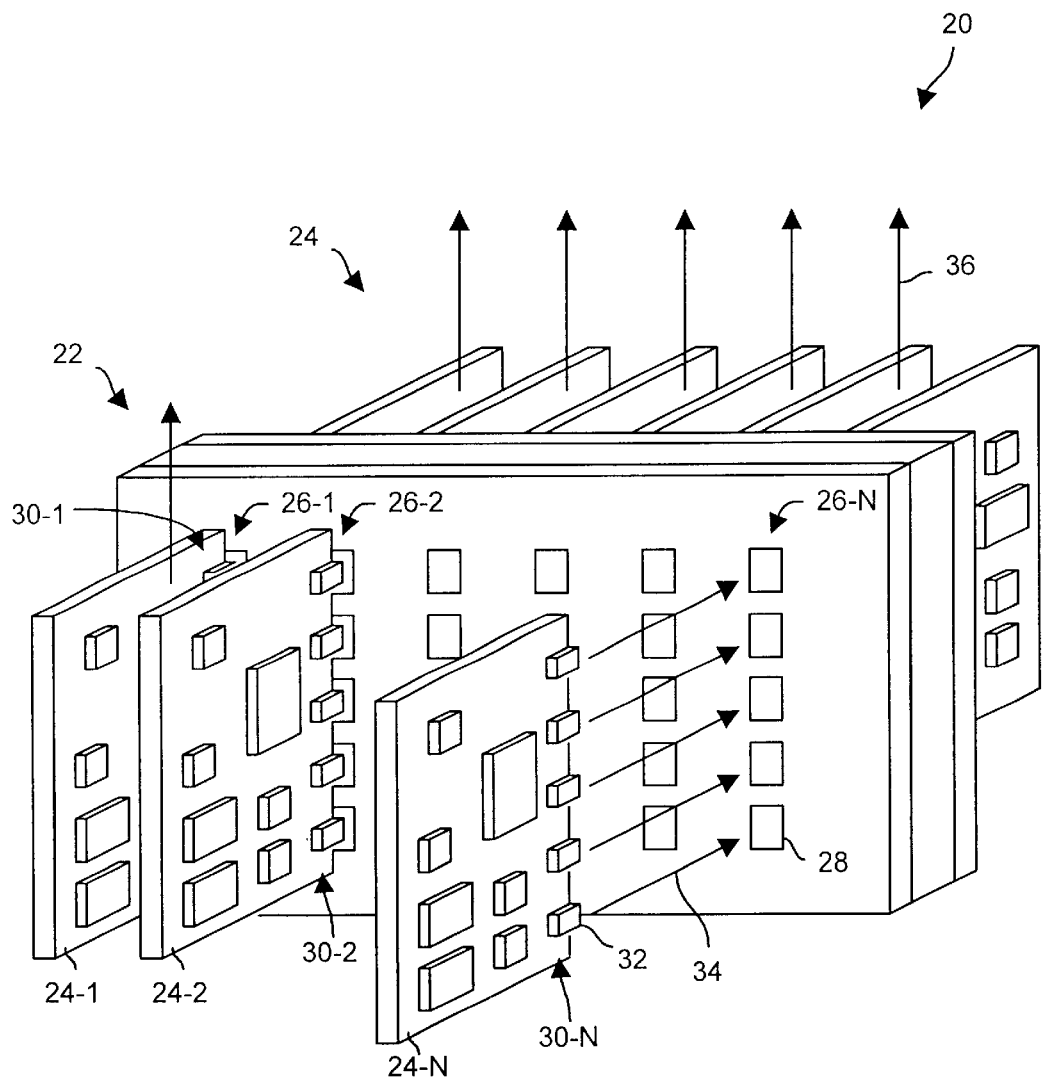
FIG. 1 is a perspective view of an electronic system which is suitable for use by the invention.

FIG. 1 shows an electronic system 20 which is suitable for use by the invention. The electronic system 20 includes an interconnect 22, and a set of circuit boards 24-1, 24-2, . . . (e.g., collectively, circuit boards 24). The interconnect 22 includes columns 26-1, 26-2, . . . (e.g., collectively columns 26) of fiber optic interconnect connectors 28 on both sides. The set of circuit boards 24 includes sets 30-1, 30-2, . . . of fiber optic circuit board connectors 32 which are capable of engaging with the columns 26 of fiber optic interconnect connectors 28 to form fiber optic connections. For example, when the circuit board 24-N is moved toward the interconnect 22 in the direction 34, as shown in FIG. 1, a set 30-N of fiber optic circuit board connectors 32 of the circuit board 24-N engages with a column 26-N of fiber optic interconnect connectors 28 to form a set of fiber optic connections.

The interconnect 22 provides fiber optic pathways between the set of circuit boards 24 thus enabling the circuit boards 24 to communicate with each other using fiber optic signals. That is, the fiber optics signals exchanged between different circuit boards 24 pass through fibers housed within the interconnect 22. Accordingly, the fiber optic pathways between the circuit boards 24 are enclosed and protected to prevent tampering or inadvertent changing. Additionally, the pathways are protected against damage (e.g., the cables will not have an opportunity to get caught on something). Furthermore, the fibers do not interfere with air flow pathways 36 between the circuit boards 24 thus permitting an air stream to adequately pass between the circuit boards 24 and remove heat.

It should be understood that the interconnect 22 provides a well-arranged structure of many fiber optic pathways (e.g., 128 fiber optic connectors). The user of the backplane does not need to plug-in any individual cables or be overwhelmed with sorting out a maze of cables. Rather, the user can simply engage and disengage circuit boards 24 with the interconnect 22 in a traditional manner (e.g., sliding circuit boards in and out of a card cage). Further details of the invention will now be provided with reference to FIG. 2.

Figure 2:
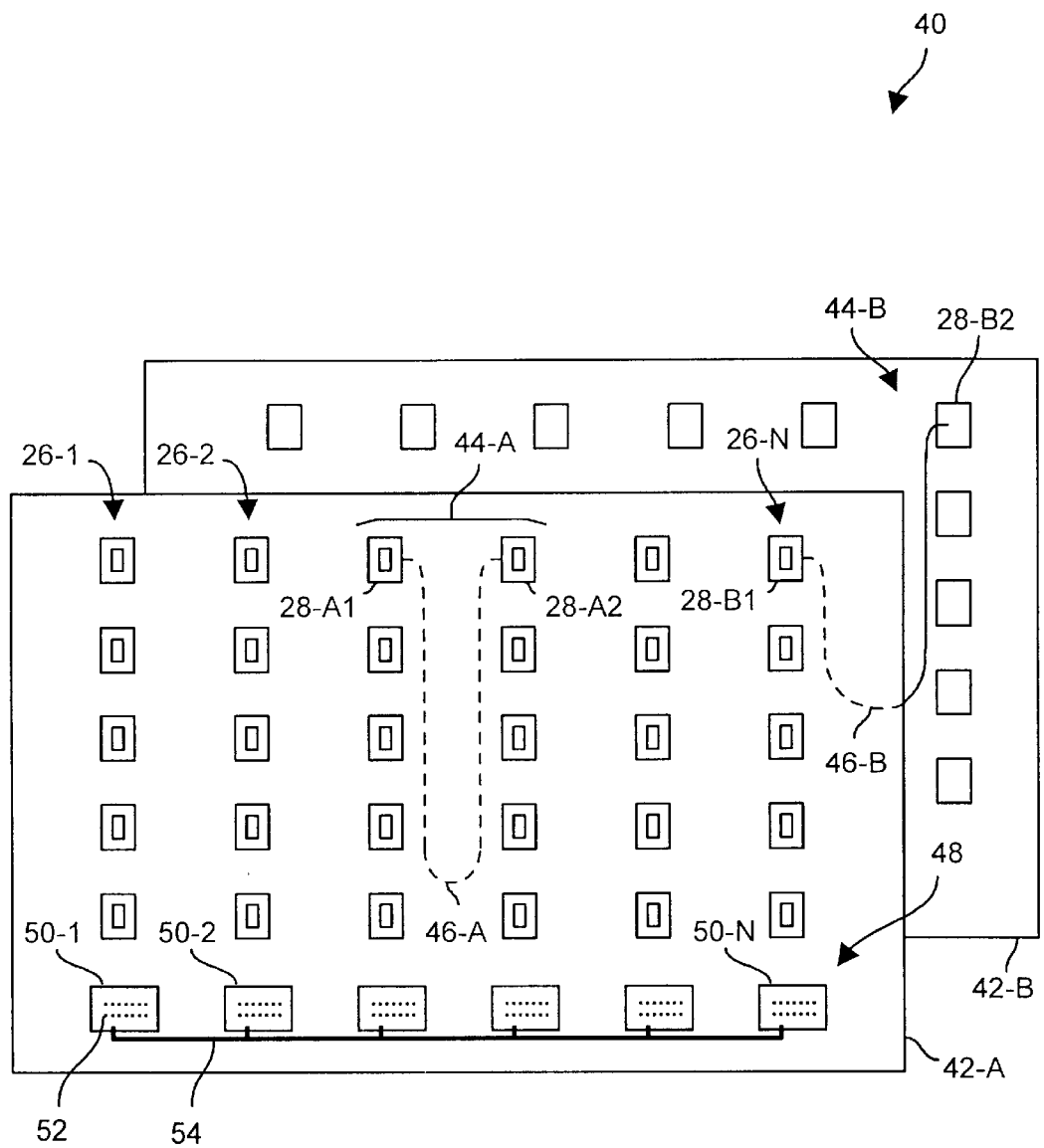
FIG. 2 is a perspective view of portions of an interconnect of the electronic system of FIG. 1.

FIG. 2 is a perspective view 40 of portions of the interconnect 22 of the electronic system 20 of FIG. 1. As shown, the interconnect 22 includes two planar members 42-A, 42-B (collectively, planar members 42) and a set of fiber optic cable assemblies 44 (only two fiber optic cable assemblies 44-A, 44-B being shown in FIG. 2 for simplicity). Each fiber optic cable assembly 44 includes a segment 46 (e.g., segment 46-A) of fiber optic cable, and a pair of fiber optic interconnect connectors 28 (e.g., fiber optic interconnect connectors 28-A1, 28-A2) which terminate the fiber optic cable segment 46.

The fiber optic cable assemblies 44 install into the planar members 42 such that the fiber optic interconnect connectors 28 face outward (i.e., reside on an outer surface of the planar members 42) and such that the fiber optic cable segments 46 reside between the planar members 42 (i.e., reside in an interconnect inner region defined by the inner surfaces of the planar members 42). Accordingly, only the ends of the fiber optic interconnect connectors 28 are exposed, and none of the fiber optic cable segments 46 are exposed.

Some fiber optic cable assemblies 44 install into a single planar member 42. For example, fiber optic interconnect connectors 28-A1, 28-A2 of a fiber optic cable assembly 44-A install through holes defined only by the planar member 42-A such that a fiber optic cable segment 46-A of the fiber optic cable assembly 44-A (shown as a dashed line because the fiber optic cable segment 46-A is on the other side of the planar member 42-A) resides between the planar members 42.

In contrast, some fiber optic cable assemblies 44 install between both planar members 42. For example, a fiber optic interconnect connector 28-B1 of a fiber optic cable assembly 44-B installs through a hole defined by the planar member 42-A and a fiber optic interconnect connector 28-B2 of the fiber optic cable assembly 44-B installs through a hole defined by the planar member 42-B. Additionally, a fiber optic cable segment 46-B of the fiber optic cable assembly 44-B (shown partially as a dashed line because part of the fiber optic cable segment 46-B is hidden by the planar member 42-A) resides between the planar members 42.

Although only two fiber optic cable assemblies 44 are shown in FIG. 2 for simplicity, it should be understood that the interconnect 22 includes many fiber optic cable assemblies 44. In particular, the fiber optic interconnect connectors 28 of the fiber optic cable assemblies 44 insert through holes defined in the planar members 42 to form the columns 26 of fiber optic interconnect connectors 28 which engage corresponding sets 30 of fiber optic circuit board connectors 32 of the circuit boards 24 (also see FIG. 1). As will be described in further detail later, the fiber optic cable assemblies 44 preferably are installed into the planar members 42 using automated machinery in order to reliably place and position the fiber optic cable assemblies 44 relative to the planar members 42.

Optionally, the interconnect 22 further includes a set of electrical conductors 48 which extend along one or both of the planar members 42. For example, as shown in FIG. 2, the electrical conductors 48 include (i) electrical connectors 50-1, 50-2, . . . (e.g., an array of metallic pins 52 held in a plastic housing) that reside at the bottoms of the columns 26 of fiber optic interconnect connectors 28, and (ii) conductive material 54 (e.g., patterns of etch, wire, etc.) which electrically connect the electrical connectors 50. Preferably, the conductive material 54 is metallic patterned etch which is installed onto and/or into the planar members 42 using circuit board fabrication techniques. In one arrangement, the electrical conductors 48 reside on both planar members 42 and connect together through flexible electrical conductive material (e.g., wires, flex cable, ribbon cable, etc.) which extends across the planar members 42 in a manner similar to that of the segments of fiber optic cable 46:

The electrical conductors 48 enable electrical signals to travel through the interconnect 22 to the circuit boards 24. For example, electrical conductors 48 can carry power supply signals to provide power to the circuit boards 24. As another example, the electrical conductors 48 can carry presence signals exchanged between the circuit boards 24 in order for the circuit boards 24 to indicate their presence, or absence, to each other thus allowing the circuit boards 24 to understand when and when not to send fiber optic signals through the interconnect 22. Preventing circuit boards from transmitting fiber optic signals through fiber optic cable assemblies 44 which are not terminated at the other end (e.g., by another circuit board 24) would otherwise run the risk of injuring a bystander with the fiber optic signals.

It should be understood that the use of fiber optic cable assemblies 44 within the interconnect 22 enables the assemblies 44 to be pre-qualified (i.e., tested and screened ahead) of installation with the interconnect 22. In one arrangement, the assemblies 44 are pre-tested, pre-tensioned, etc. prior to their installation within the planar members 42-A, 42-B. Further details of the invention will now be provided with reference to FIG. 3.

Figure 3:
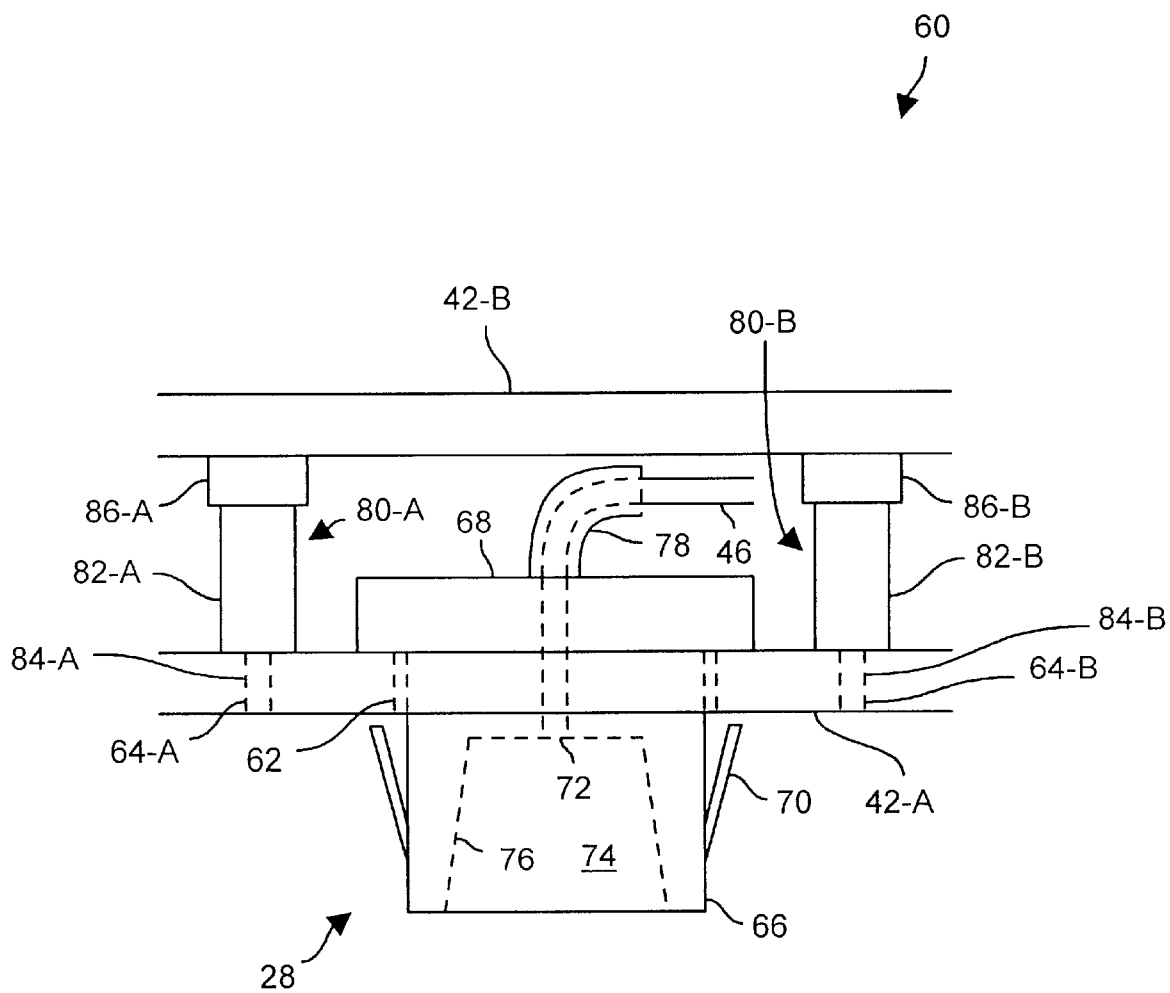
FIG. 3 is a cross-sectional view of a fiber optic connector and optional standoffs of the interconnect of the electronic system of FIG. 1.

FIG. 3 is a cross-sectional view of a portion 60 of the interconnect 22. Recall that each planar member 42 defines holes, and the fiber optic interconnect connectors 28 of the fiber optic cable assemblies 44 install through those holes. For example and as shown in FIG. 3, the planar member 42-A defines a hole 62 through which the fiber optic interconnect connector 28 inserts and installs. Additionally, one or both planar members 42 (e.g., the planar member 42-A) optionally defines another set of holes 64 which are used by components other than the connectors 28 (e.g., see standoff holes 64-A, 64-B in FIG. 3).

As shown in FIG. 3, the fiber optic interconnect connector 28 includes a connecting portion 66, and a cable receiving portion 68. The connecting portion 66 defines a set of tabs 70 (i.e., detents) that compress when the connecting portion 66 of the connector 28 passes through the hole 62 of the planar member 42-A, and expand afterward to retain the connector 28 within the hole of the planar member 42-A. The cable receiving portion 68 receives an end of the fiber optic cable segment 46, and the connecting portion 66 holds the end 72 of the fiber optic filament (i.e., the fiber) as well as any surrounding cable insulation.

By way of example only, the connector 28 is configured as a female connector and defines a cavity 74 into which a fiber optic circuit board connector 32 (when configured as a male) can engage. Preferably, sides 76 of the connecting portion 66 are tapered to enable the fiber optic circuit board connector 32 (also preferably tapered) to self-align within the connector cavity 74 to provide proper alignment of fiber ends. In one arrangement, the connector 28 defines four engagement sides 76 and two of the four engagement sides 76 are tapered for self-alignment along a single axis (e.g., the X-axis). In another arrangement, all of the four engagement sides 76 are tapered for self-alignment along multiple axes (e.g., the X and Y axes).

Optionally, the fiber optic interconnect connector 28 further includes a bending member 78 (e.g., an elbow, a sleeve, a sheathing, a fitting, etc.) that provides a particular bend radius to the fiber optic cable segment 46 over a particular length. In one arrangement, the bending member 78 provides a 90 degree bend radius over a length of 0.5 inches.

Additionally, the interconnect 22 optionally further includes a set of standoff members 80 (e.g., see standoff members 80-A, 80-B). Each standoff member 80 (e.g., standoff member 80-A) includes a mid portion 82 (e.g., mid portion 82-A), a first end 84 (e.g., end 84-A) which inserts through a hole 64 (e.g., hole 64-A) defined by a planar member 42 (e.g., planar member 42-A) and a second end 86 (e.g., end 86-A) which contacts the other planar member 42 (e.g., planar member 42-B). The set of standoff members 80 facilitate positioning of the two planar members 42 relative to each other and prevent the distance between the two planar members 42 from becoming so small that the fiber optic cable segments are crushed or damaged. Further details of the invention will now be provided with reference to FIG. 4.

Figure 4:
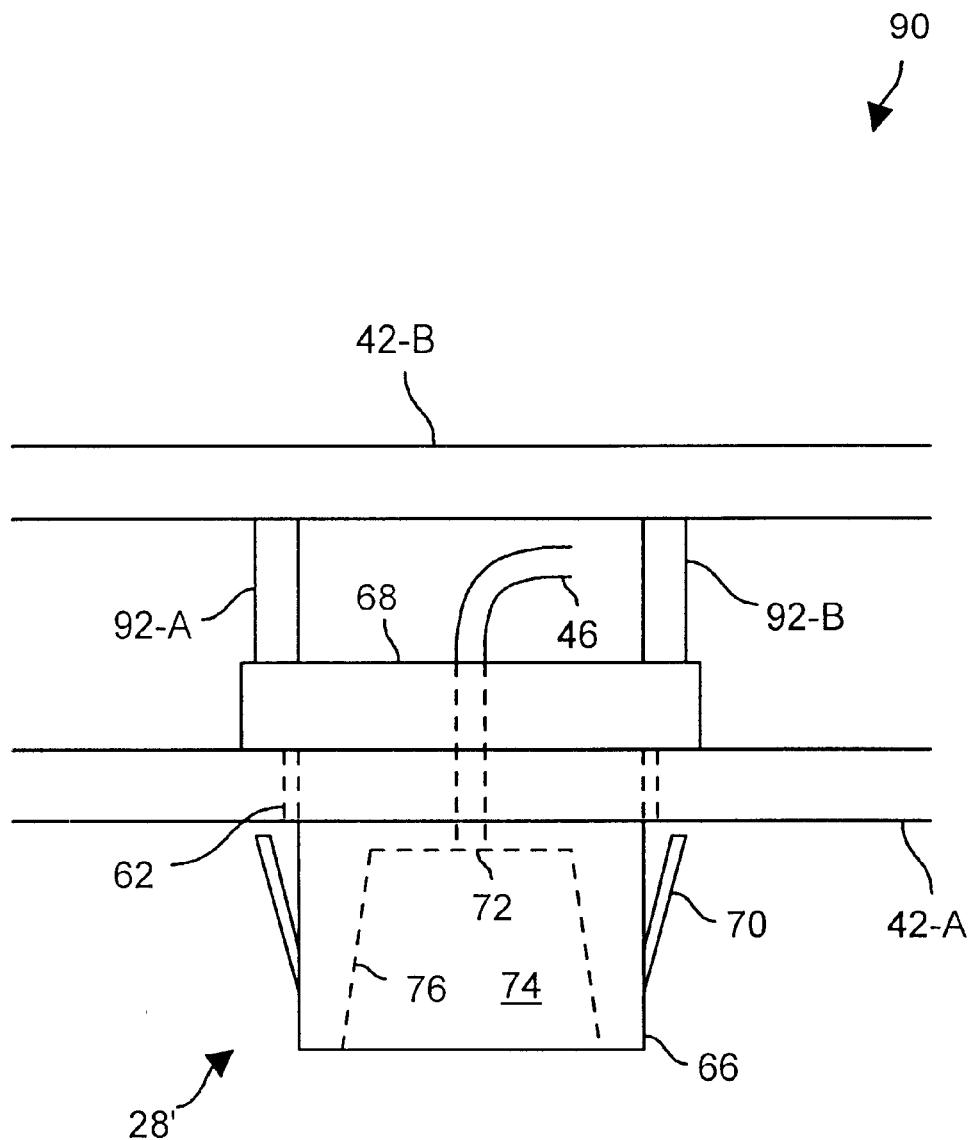
FIG. 4 is a cross-sectional view of an alternative fiber optic connector having standoff portions which is suitable for use in place of the fiber optic connector of FIG. 3.

FIG. 4 is a cross-sectional view of a portion 90 which is suitable for use by the interconnect in place of the portion 60 of FIG. 3. The portion 90 of FIG. 4 is similar to the portion 60 of FIG. 3 in that the portion 90 includes a fiber optic interconnect connector 28' which extends through a hole 62 of the planar member 42-A. However, in contrast to the fiber optic interconnect connector 28 of FIG. 3, the fiber optic interconnect connector 28' of FIG. 4 includes additional standoff portions 92-A, 92-B. As shown in FIG. 4, the standoff portions 92-A, 92-B extend from the cable receiving portion 68 toward the planar member 42-B and contact the planar member 42-B. The standoff portions 92 of the connector 28' facilitate positioning of the planar members 42 relative to each other thus preventing the fiber optic cable segments from being squished and permanently disfigured. Additionally, the use of the standoff portions 92 alleviate the need for additional holes in the planar member for mounting separate standoff members (e.g., see holes 64-A, 64-B in FIG. 3). Furthermore, the standoff portions 92 receive force from one planar member 42 (e.g., the planar member 42-B) to push the connector 28' firmly against the other planar member 42 (e.g., the planar member 42-A) for proper positioning of the connector 28' against the other planar member 42.

It should be understood that the bending member 78 of the portion 60 of FIG. 3 is not shown in FIG. 4 for simplicity. Nevertheless, the connector 28' can include the bending member 78. Further details of the invention will now be provided with reference to FIG. 5.

Figure 5:
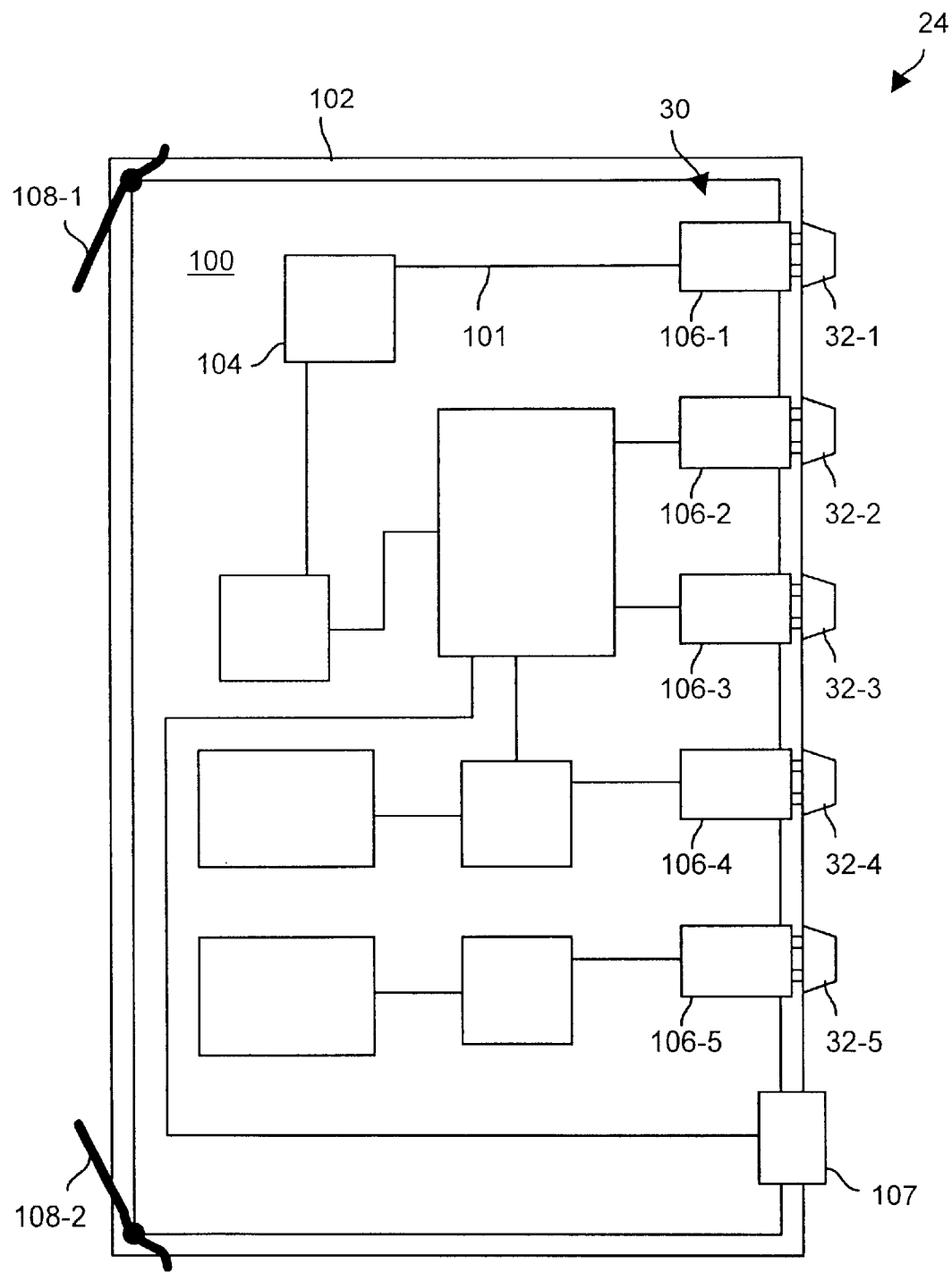
FIG. 5 is a top view of a circuit board of the electronic system of FIG. 1.

FIG. 5 is a top view of a circuit board 24 of the electronic system of FIG. 1. As mentioned above, the circuit board 24 includes a set 30 of fiber optic circuit board connectors 32 (e.g., connectors 32-1, 32-2, and so on). The circuit board 24 further includes a section of circuit board material 100, e.g., layers of non-conductive material, and patterned layers of conductive material 101 sandwiched together. The circuit board further includes a rigid frame 102 (e.g., sheet metal, aluminum, etc.) that extends around the periphery of the section of circuit board material 100, a set of circuit board components 104 (e.g., integrated circuits, capacitors, resistors, etc.) and a set of transceivers 106. Each transceiver 106 and its corresponding fiber optic circuit board connector 32 forms a fiber optic connector assembly. The fiber optic circuit board connectors 32, the circuit board components 104 and the transceivers 106 are mounted to the section of circuit board material 100. The conductive material 101 of the section of circuit board material 100 electrically connects the circuit board components 104 and the transceivers 106 together.

Optionally, the circuit board 24 further includes an electrical connector 107 that connects to the conductive material 101 in order to enable the circuit board 24 to send out and receive external electrical signals. In one arrangement, the electrical connector 107 connects to the electrical conductors 48 residing on the interconnect 22 (also see FIG. 2).

The circuit board 24 further includes a set of handles 108-1, 108-2 which a user (e.g., a technician) actuates when installing the circuit board 24 onto the interconnect 22. Preferably, the user moves the handles 108-1, 108-2 simultaneously so that they grab a frame (not shown), e.g., a card cage, which is in a fixed position relative to the interconnect 22. The handles 108-1, 108-2 are preferably configured to move the circuit board 24 into a fixed position relative to the interconnect 22 so that the fiber optic circuit board connectors 32 engage with the fiber optic interconnect connectors 28, 28' of the interconnect 22. Preferably, the user can move the handles 108-1, 108-2 in the opposite direction to remove the circuit board 24 from the interconnect 22.

It should be understood that the interconnect 22 enables the circuit boards 24 to engage and disengage conveniently and in a well-organized manner. That is, the arrangement of the circuit boards 24 and the interconnect 22 allow the circuit boards 24 to easily install onto and de-install from the interconnect (e.g., during replacement). Additionally, the fiber optic cable assemblies 44 within the interconnect 22 can be positioned relative to the planar members 42 such that there is no interference with an air flow 36 (see FIG. 1) that cools the circuit boards 24, and no opportunity for tampering or inadvertently modifying the interconnect 22. Further details of the invention will now be provided with reference to FIG. 6.

Figure 6:
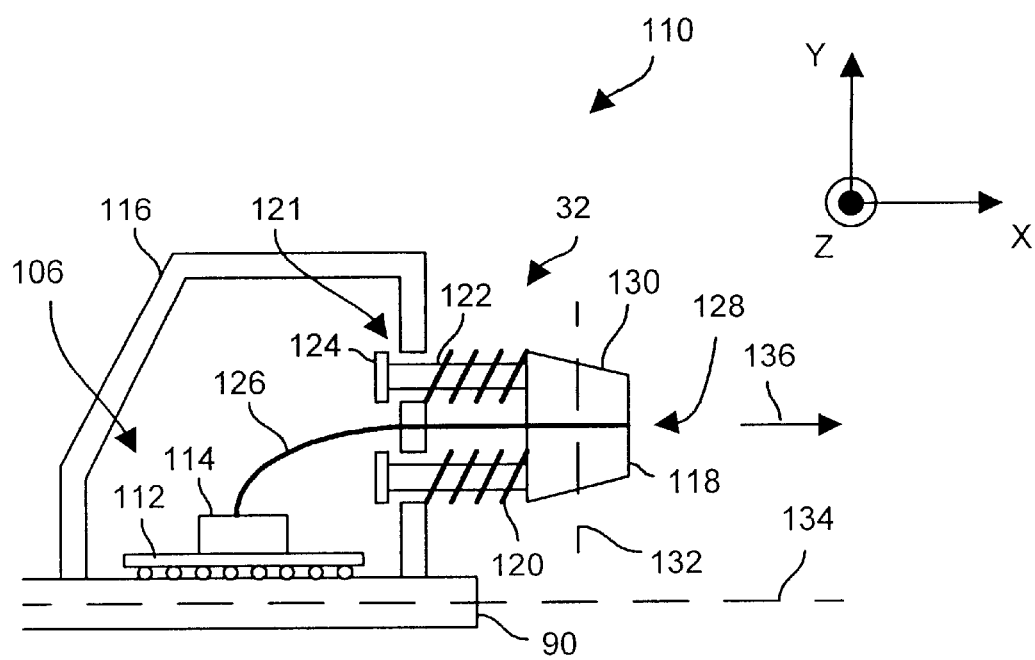
FIG. 6 is a cross-sectional side view of a fiber optic connector assembly which is suitable for use by the circuit board of FIG. 5.

FIG. 6 shows a cross-sectional view of a fiber optic connector assembly 109 which is suitable for use on the circuit boards 24 of FIG. 1. The fiber optic connector assembly 109 includes a transceiver 106 and a fiber optic circuit board connector 32 (also see FIG. 5). As shown in FIG. 6, the transceiver 106 of the fiber optic connection assembly 109 includes an electronic circuit portion 112 and a transducer 114. The transducer 114 converts an electronic signal into a fiber optic signal for transmission through the connector 32, and/or converts a fiber optic signal into an electronic signal for use within the circuit board 24 (FIG. 5). The electronic circuit portion 112 is shown, by way of example only, as a Ball Grid Array (BGA) device which operates as an interface between the transducer 114 and the other circuitry 104 of the circuit board 24. For example, the electronic circuit portion 112 can implement a parallel to serial conversion, implement a protocol (e.g., 8B/10B, Infiniband), etc.

The fiber optic connector assembly 110 further includes a base portion 116 that mounts to the section of circuit board material 90, a connecting portion 118 which forms the fiber optic circuit board connector 32, and a resilient member 120 that is disposed between the base portion 116 and the connecting portion 18. The connecting portion 118 of the fiber optic connector assembly 109 forms the fiber optic circuit board connector 32 of FIGS. 1 and 5. The resilient member 120 operates as a locating mechanism to properly center the connecting portion 118 within its corresponding fiber optic interconnect connector 28, and provide the proper tension (i.e., force) against the connector 28 for a healthy fiber optic connection. The base portion 116 supports defines a set of holes 121 through which pass extending members 122 of the connecting portion 118. The extending members 122 include end members 124 that prevent the connecting portion 118 from moving out of the base portion 116.

The fiber optic connector assembly 110 further includes a fiber 126 that extends from the transducer 114 to the connecting portion 118. The end 128 of the fiber 126 aligns with a corresponding fiber end of a fiber optic interconnect connector 28 when the circuit board 24 properly engages with the interconnect 22. Preferably, the connecting portion 118 defines tapered sides 130 that facilitate alignment of the connecting portion 118 within a cavity 74 defined by the fiber optic interconnect connector 28, 28' (also see FIGS. 3 and 4). In one arrangement, the connecting portion 118 has four sides, and each of the four sides is tapered for facilitated alignment in multiple directions (the Y and Z directions). In another arrangement, the connecting portion 118 has four sides but only two of the four sides are tapered for facilitated alignment along a single axis.

It should be understood that the connecting portion 118 is movable relative to the base portion 116. In particular, the holes 121 are sized such that the base portion 116 provides support for the connecting portion 118, but allows the connecting portion to move along a plane 132 for proper alignment with a corresponding fiber optic interconnect connector 28. The plane 132 (i.e., the Y-Z plane) is substantially perpendicular to the plane 134 of the section of circuit board material 90 (i.e., the X-Z plane). Furthermore, the resilient member 120, which is shown by way of example only as a coiled spring in FIG. 6, pushes the connecting portion 118 in a direction 136 (the X direction) that is substantially parallel to the plane 134 of the section of circuit board material 90 (i.e., substantially parallel to the X-Z plane). The coiled springs preferably wrap around the extending members 122 and compress when the connecting portion is moved in a direction opposite the arrow 136. Further details of the invention will now be provided with reference to FIG. 7.

Figure 7:
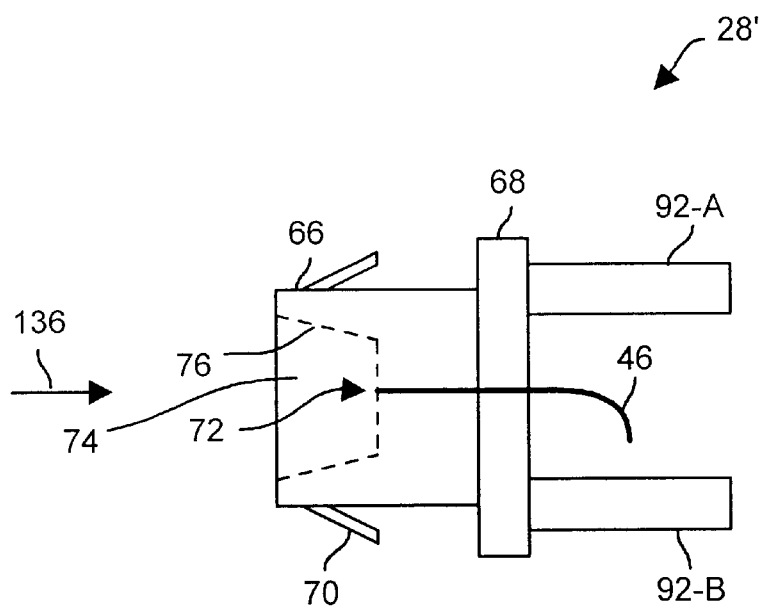
FIG. 7 is a top view of the alternative fiber optic connector of FIG. 4 which is suitable for mating with the fiber optic connector assembly of FIG. 6.

FIG. 7 is a detailed view of the fiber optic interconnect connector 28' of FIG. 4. As shown, the connecting portion 66 of the connector 28' defines tapered sides 76 which complement the tapered sides 130 of the connecting portion 118 of the fiber optic circuit board connector 32 of FIG. 6. Accordingly, the fiber optic circuit board connector 32 self-aligns with the fiber optic interconnect connector 28' when the fiber optic circuit board connector 32 moves in the direction 136 and into the cavity 74 of the fiber optic interconnect connector 28'. Preferably, the dimensions and tolerances of the connecting portion 66 of FIG. 7 and the connecting portion 118 of FIG. 6 are such that connecting portions 66, 118 form a properly aligned and reliable fiber optic connection with minimal light energy loss.

It should be understood that the distance between the tabs 70 and the cable receiving portion 68 is such that the connecting portion 66 properly passes through a hole 62 in a planar member 42 (also see FIG. 4), and such that the tabs re-extend to lock the fiber optic interconnect connector 28' into the hole 62. It is acceptable that the tabs 70 and the cable receiving portion 68 not be perfectly distanced to enable a tight lock within the hole 62 of the planar member 42 (e.g., the planar member 42-A) since the standoff portions 92-A, 92-B of the connector 28' will contact the other planar member 42 (e.g., the planar member 42-B) and push the connecting portion 66 as far as it can go into the first planar member (e.g., the planar member 42-A). Further details of the invention will now be provided with reference to FIGS. 8-11.

Figure 8:
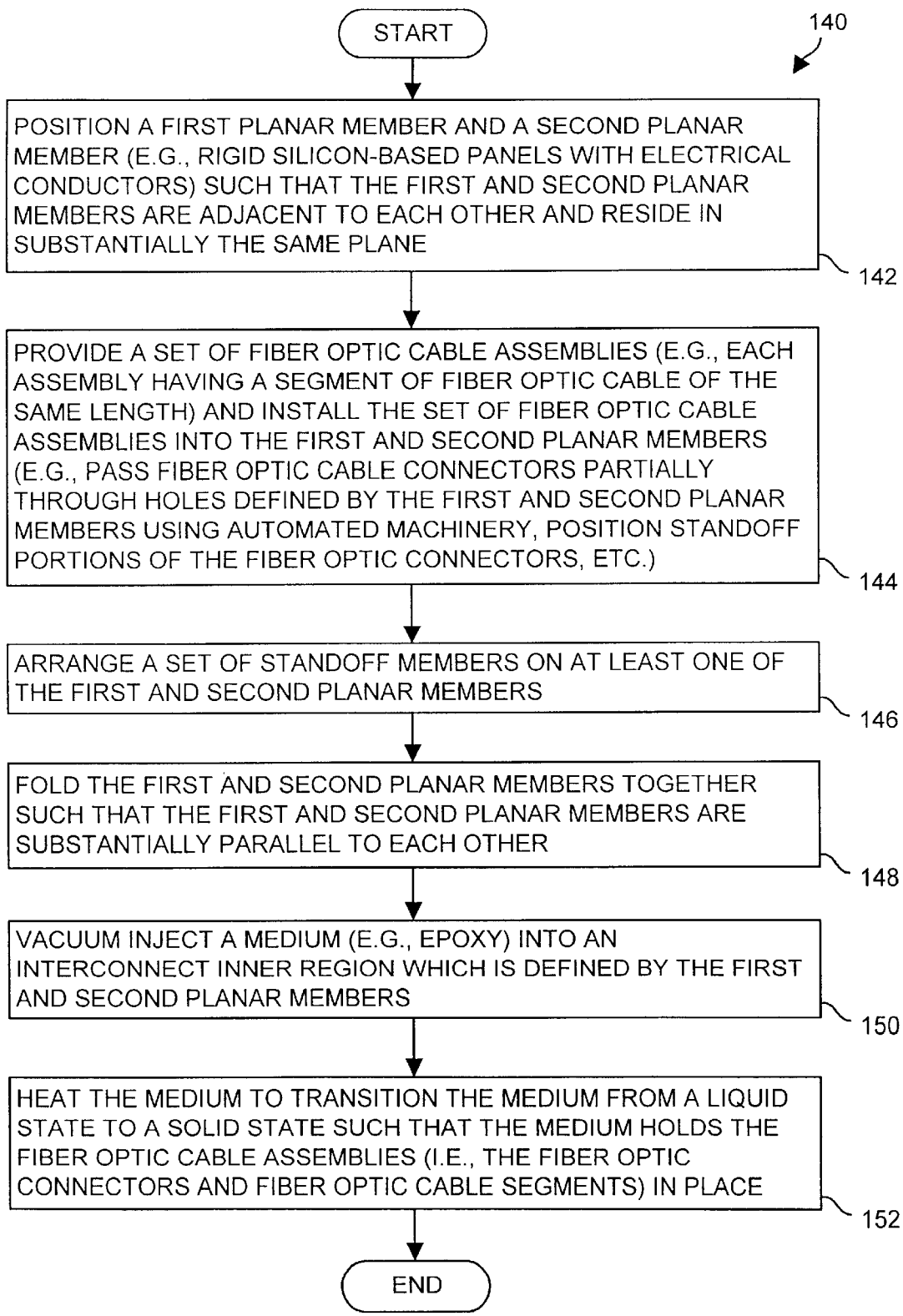
FIG. 8 is a flowchart of a procedure for making the interconnect of the electronic system of FIG. 1.
Figure 9:
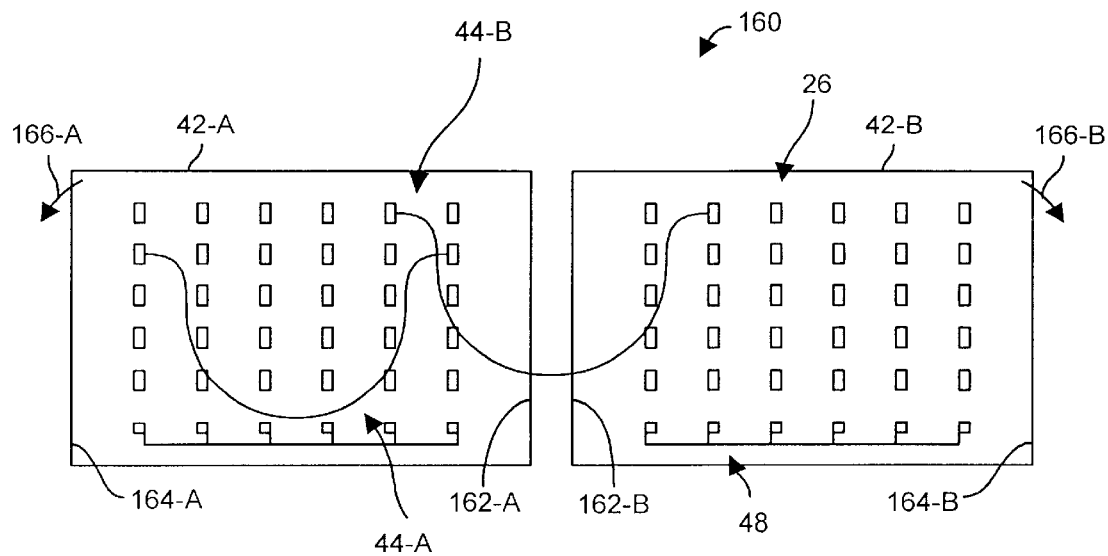
FIG. 9 is a top view of portions of the interconnect of the electronic system of FIG. 1 at an intermediate stage of assembly.

FIG. 8 shows a flowchart of a procedure 140 performed by a manufacturer when making the interconnect 22 of the electronic system 20 of FIG. 1. In step 142, the manufacturer positions a first planar member and a second planar member such that the first and second planar members are adjacent to each other and reside in substantially the same plane. FIG. 9 shows the planar members 42-A, 42-B in such a position, i.e., adjacent to each other and residing in substantially the same plane. Preferably, the planar members 42-A, 42-B are made of a durable and rigid material. In one arrangement, the planar members 42-A, 42-B are made of non-conductive circuit board material (e.g., plastic, FR4, G10, other silicon-based material, and the like). In another arrangement, the planar members 42-A, 42-B are made of metal.

In step 144, the manufacturer provides a set of fiber optic cable assemblies and installs the set of fiber optic cable assemblies into the first and second planar members through holes defined in the first and second planar members. As shown in FIG. 9, some fiber optic cable assemblies 44-A, 44-B have been installed into the first and second planar members 42-A, 42-B (i.e., through holes defined therein). Some fiber optic cable assemblies (e.g., the assembly 44-A) installs into only one planar member (e.g., the planar member 42-A) while other fiber optic cable assemblies (e.g., the assembly 44-B) extends across both planar members. Preferably, each of the fiber optic cable assemblies 44-A, 44-B, etc. has a same length so that each assembly 44 provides substantially the same light signal delay. In one arrangement, the length is slightly longer that the longest distance or run required between two holes 62 to be connected. Any slack in the assemblies 44 is well managed and laid out so that the cable segments do not bunch up on each other. Either the connector 28 of FIG. 3 or the connector 28' of FIG. 4 is suitable for use in step 144.

Preferably, automated machinery installs the fiber optic cable assemblies 44 into the planar members 42. The user of automated machinery minimizes the opportunity for error and enables consistent manufacturing of interconnects 22 from one interconnect to another. Furthermore, automated machinery can be programmed to lay out any slack in the fiber optic cable segments 46 of the fiber optic cable assemblies 44 (also see FIG. 2) to prevent entanglement and avoid segments from interfering with each other during the fiber optic cable assembly installation process.

In step 146, the manufacturer arranges a set of standoff members 78 on at least one of the first and second planar members 42 (also see FIG. 3). Such standoff members 78 preferably insert into holes in one planar member 42 and contact the inner surface of the other planar member 42 in order to proper position the planar members 42 relative to each other and to prevent the planar members 42 from coming too close to each other where they could compress and damage the fiber optic cable segments 46 of the fiber optic cable assemblies 44. Step 145 may be unnecessary if the fiber optic interconnect connectors 28 include standoff portions 92-A, 92-B (also see FIG. 4).

Figure 10:
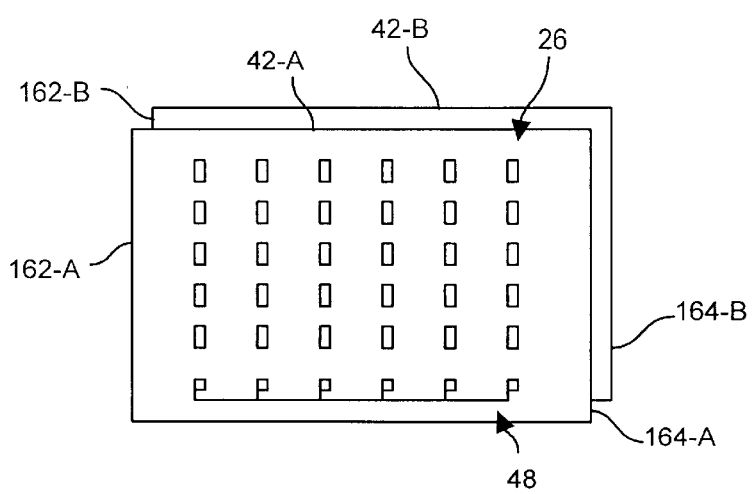
FIG. 10 is a perspective view of portions of the interconnect of the electronic system of FIG. 1 at another stage of assembly.

In step 148, the planar members 42 are folded together such that they are substantially parallel to each other. This creates a double-sided fiber optic backplane, i.e., a rigid interconnect that can engage with circuit boards on both sides. FIG. 10 shows the planar members 42-A, 42-B folded together so that they are substantially parallel to each other. Either standoff members 78 or standoff portions 92 of the connectors 28 maintain separation between the planar members 42. It should be understood that the planar members 42-A, 42-B included two proximate sides 162-A, 162-B and two distal sides 164-A, 164-B (refer back to FIG. 9), and that the folding operation maintained the proximity of the two proximate sides 162-A, 162-B and brought the two distal sides 164-A, 164-B together (see FIG. 10). Accordingly, none of the fiber optic cable assemblies 44 needed to be unplugged or moved after initial installation. Rather, the fiber optic cable assemblies 44 simply comported with change in position of the two planar members 42.

Figure 11:
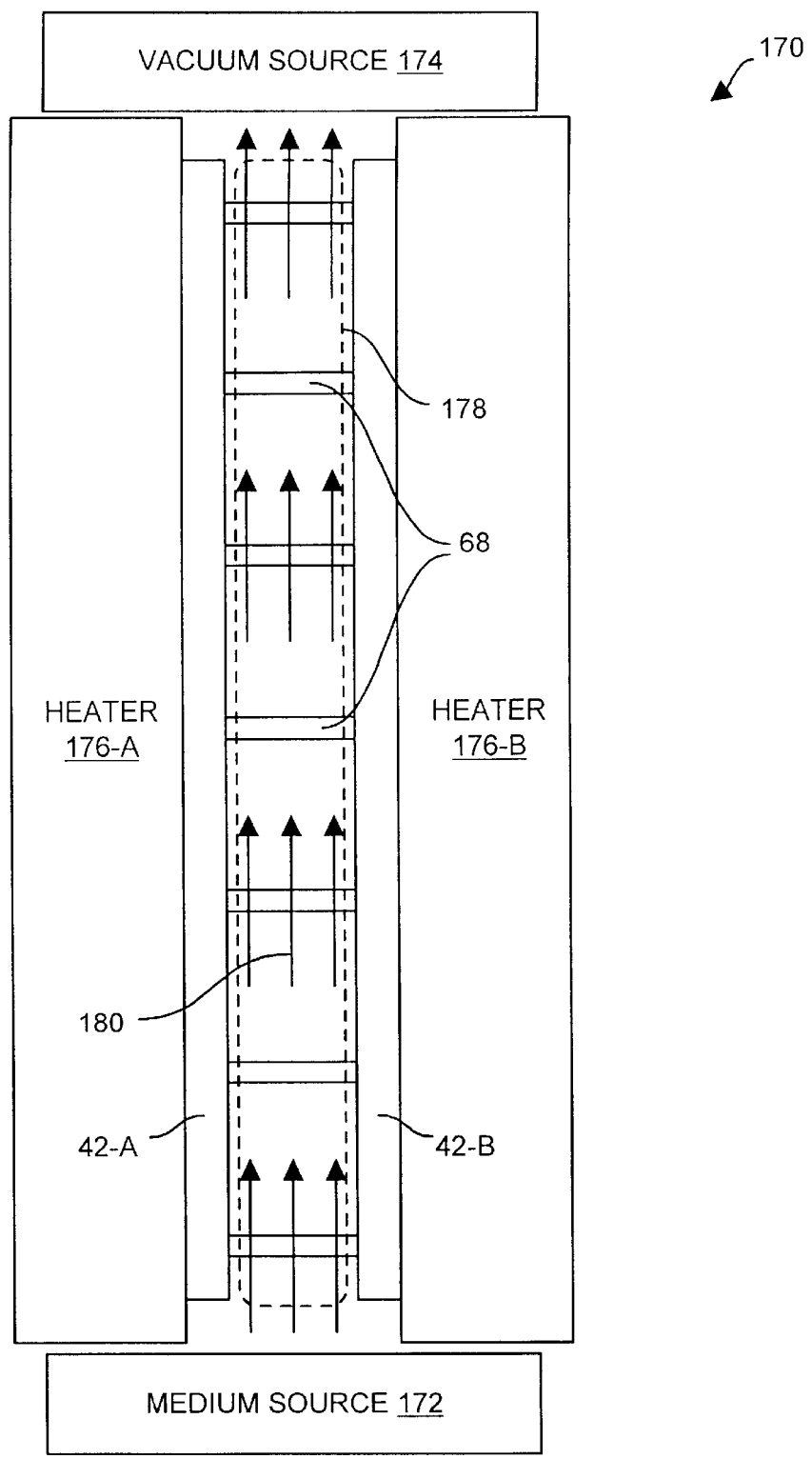
FIG. 11 is a top view of portions of the interconnect of the electronic system of FIG. 1 at yet another stage of assembly.

In step 150, the manufacturer vacuum injects a medium into an interconnect inner region defined by the first and second planar members. FIG. 11 shows a top view of an assembly 170 having a medium source 172, a vacuum source 174, and two heaters 176-A, 176-B. The medium source 172 resides at one end of an interconnect inner region 178 defined by the inner surfaces of the planar members 42-A, 42-B. The vacuum source 174 resides at the other end of the interconnect inner region 178. The heaters 176-A, 176-B reside along the outer surfaces of the planar members 42-A, 42-B. During operation, the vacuum source 174 provides a vacuum in the interconnect inner region 178 by drawing air in the direction 180 out of the interconnect inner region 178. After the vacuum source 174 provides the vacuum, the medium source provides the medium (e.g., an epoxy, glue, viscous suspension, foam, etc.) which enters the interconnect inner region 178 in the direction 180. In one arrangement, the medium is a relatively quick drying polymer (e.g., glass epoxy resin). In another arrangement, the medium is a light-weight foam (e.g., a liquid styrofoam mixture).

In step 152, the medium is heated to solidify the medium. In particular, as shown in FIG. 11, the heaters 176-A, 176-B (e.g., heated metal plates) heat the medium to facilitate a state change of the medium from a liquid state to a solid state.

After the medium solidifies, the structure is now the interconnect 22 (also see FIG. 1). The manufacturer can perform additional processing steps if desired. For example, if needed, the manufacturer can shave or polish off any excess portions of the medium, and add a protective coating to the interconnect 22 (e.g., if the medium is a material other than epoxy). As another example, the manufacturer can drill mounting holes into and/or mount fittings (e.g., mounting studs) to the interconnect 22.

When the procedure 140 is complete, the interconnect 22 is preferably extremely rigid due to the rigid properties of the planar members 42-A, 42-B which operate as a stress skin exterior to the interconnect. Preferably, the medium, in its solid state, is light weight in order to facilitate transportation of the interconnect 22 and so as not to require special structural supports or frames when installing the interconnect within an electronic cabinet.

It should be understood that the vacuum source 174 and the medium source 172 are shown as being on opposite sides of the planar members 42-A, 42-B by way of example only. In other arrangements, the vacuum source 174 and the medium source 172 are on the same side of the planar members 42-A, 42-B. In one arrangement, the vacuum source 174 and the medium source 172 use the same nozzle or nozzles. Further details of the invention will now be provided with reference to FIG. 12.

Figure 12:
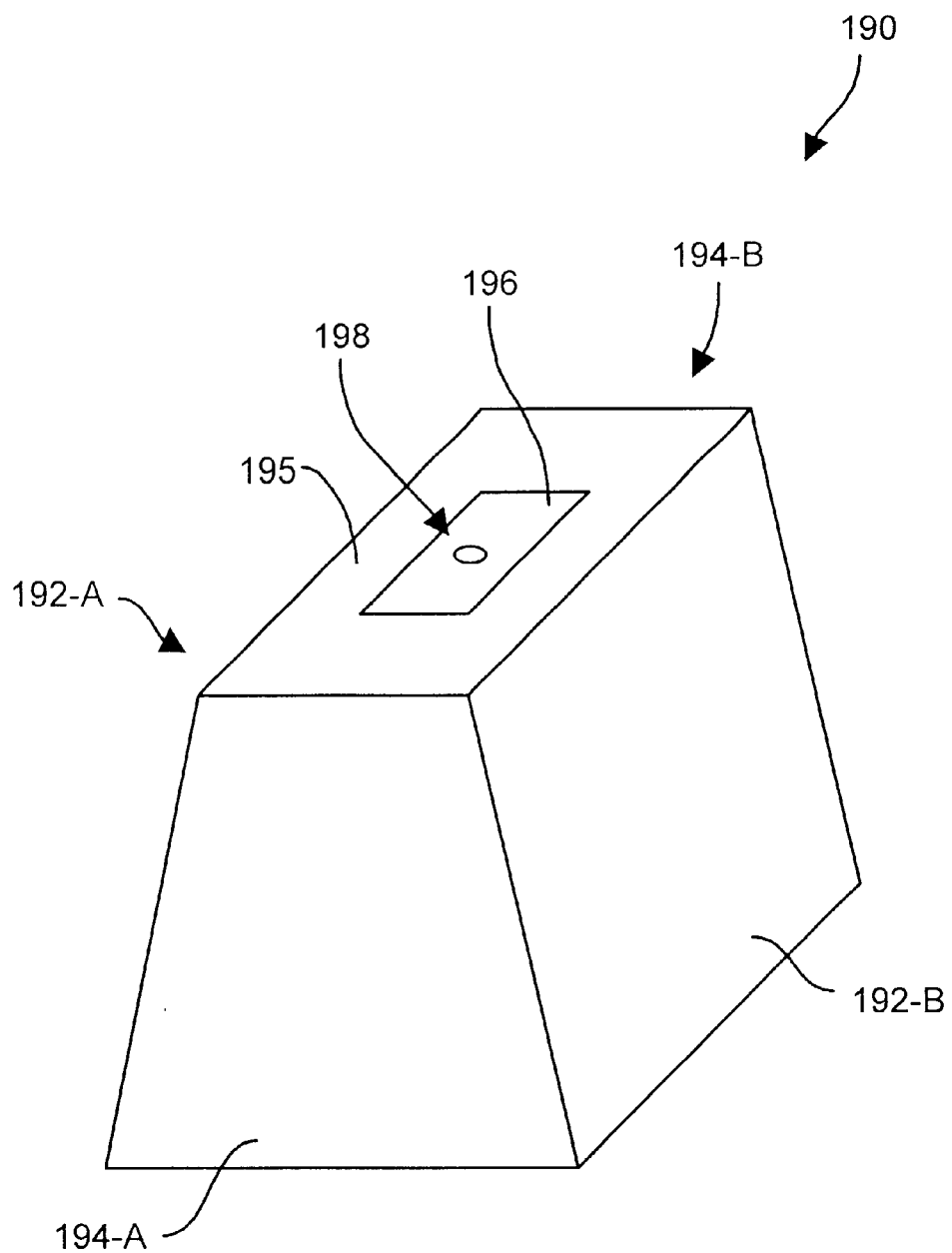
FIG. 12 is a perspective view of a connecting portion end having a fiber which is suitable for use by the fiber optic connector of FIG. 6.

FIG. 12 is a perspective view of an end 190 which is suitable for use as part of the connecting portion 118 of the fiber optic connector assembly of FIG. 6. The end 190 defines a first pair of opposite sides 192-A, 192-B, and a second pair of opposite sides 194-A, 194-B. The end 190 further defines a top 195 through which extends a ferrule 196 (e.g., an MT ferrule) that holds a fiber end 198. The rectangular shaped top 195 prevent rotation of the end 190 when it is engaged with its corresponding fiber optic interconnect connector 28, 28'.

Preferably, the pair of opposite sides 192-A, 192-B taper toward each other in a trapezoidal manner. Similarly, the pair of opposite sides 194-A, 194-B taper toward each other in a trapezoidal manner as well. Accordingly, when the cavity 74 of the fiber optic interconnect connector 28 has a similar but complementing shape (see FIG. 7), the end 190 self-aligns with the fiber optic interconnect connector 28 to form a fiber optic connection. In another arrangement, only one pair of sides is tapered. In another arrangement, none of the pairs of sides is tapered.

Figure 13:
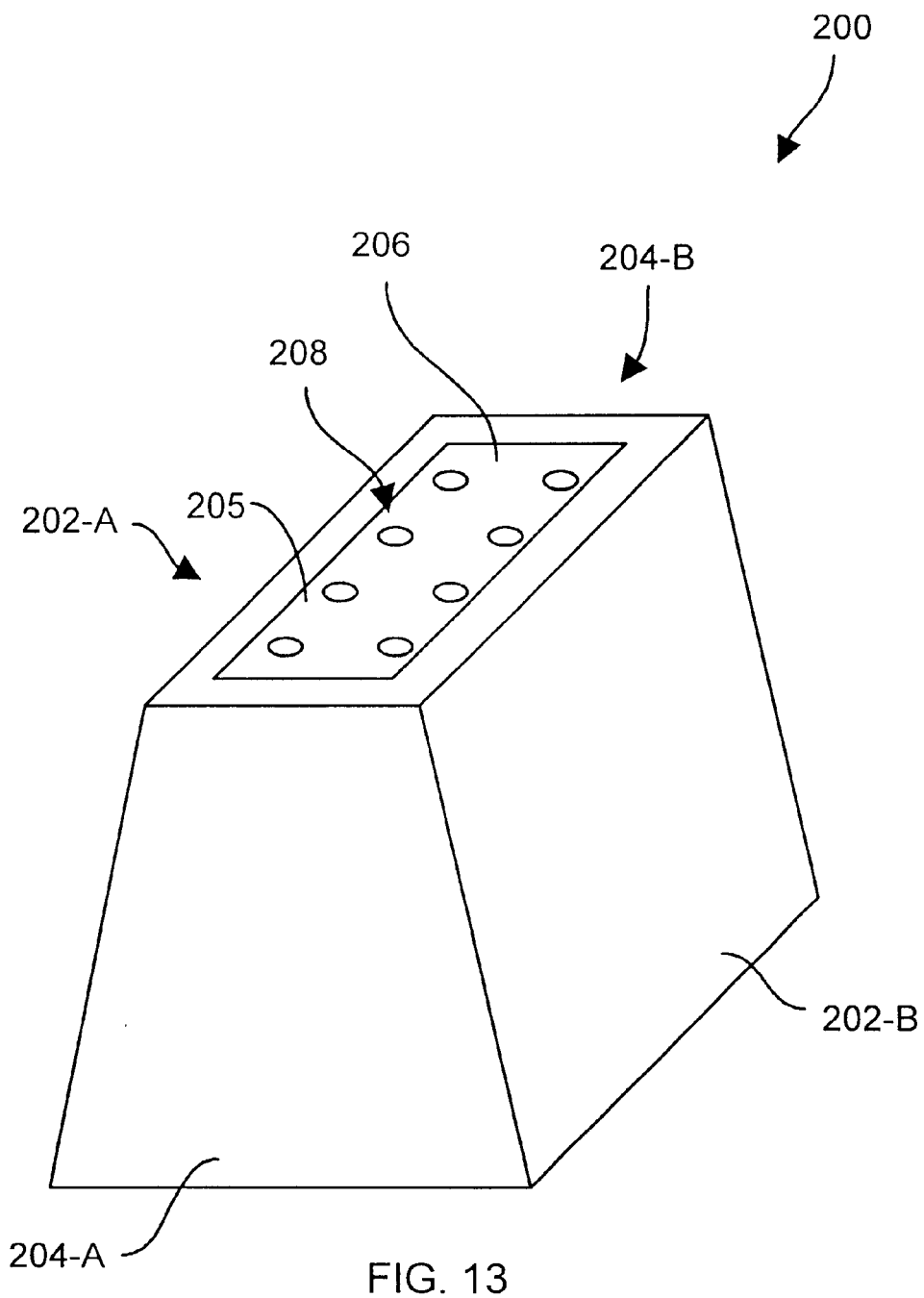
FIG. 13 is a perspective view of an alternative connecting portion end having an array of fibers and a trapezoidal shape which is suitable for use by the fiber optic connector of FIG. 6.

FIG. 13 is a perspective view of an alternative end 200 which is suitable for use as part of the connecting portion 118 of the fiber optic connector assembly of FIG. 6. The end 200 defines a first pair of opposite sides 202-A, 202-B, and a second pair of opposite sides 204-A, 204-B. The end 190 further defines a top 205 through which extends a ferrule 206 that holds an array of fiber ends 208. By way of example, the ferrule 206 holds a 2×4 fiber array. Other arrangements are suitable as well such as 1×2, 1×8, 1×12, 2×12 and 3×4 arrays.

Preferably, the end 200 of FIG. 13 has a trapezoidal shape which is similar to that of the end 190 of FIG. 12. In one arrangement, the pair of opposite sides 202-A, 202-B taper toward each other in a trapezoidal manner, and the pair of opposite sides 204-A, 204-B taper toward each other in a trapezoidal manner. Accordingly, when the cavity 74 of the fiber optic interconnect connector 28 has a similar but complementing shape (see FIG. 7), the end 200 self-aligns with the fiber optic interconnect connector 28, 28' to form a fiber optic connection. In another arrangement, only one pair of sides is tapered. In yet another arrangement, none of the pairs of sides is tapered.

It should be understood that the fiber are shown in FIG. 13 as being separated from each other by way of example only. In other arrangements, the fibers are close to each other or even in contact with each other (e.g., in a bundle formation so that the ends are grouped together. In some arrangements, the fiber ends are organized in configurations other than a rectangular array (e.g., a parallelogram, a circle, a hexagon, etc.).

Figure 14:
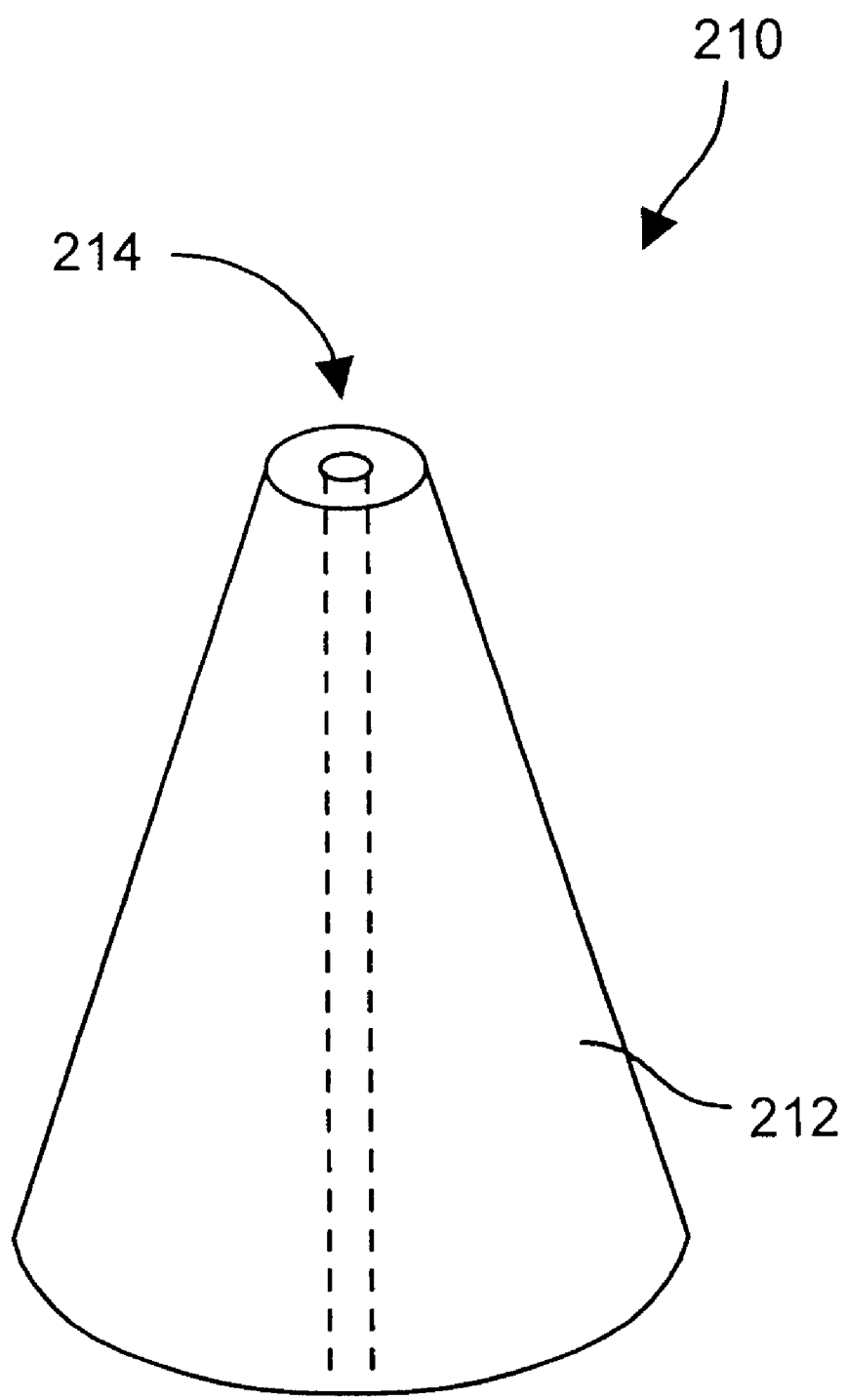
FIG. 14 is a perspective view of an alternative connecting portion end having a single fiber and a conical shape which is suitable for use by the fiber optic connector of FIG. 6.

FIG. 14 is a perspective view of an alternative end 210 which is suitable for use as part of the connecting portion 118 of the fiber optic connector assembly of FIG. 6. The end 210 defines a rounded angled surface 212 which resembles an inverted cone. The fiber extends through the end 210 and terminates at the top 214. The end 210 is suitable for use when the cavity 74 of the fiber optic interconnect connector 28 (see FIG. 6) has a complementary conical shape for receiving the end 210. The end 210 is self-aligning due to its shape, but has the capability to turn, twist or spin slightly within the fiber optic interconnect connector 28, 28' to relieve any stresses in the fiber.

Figure 15:
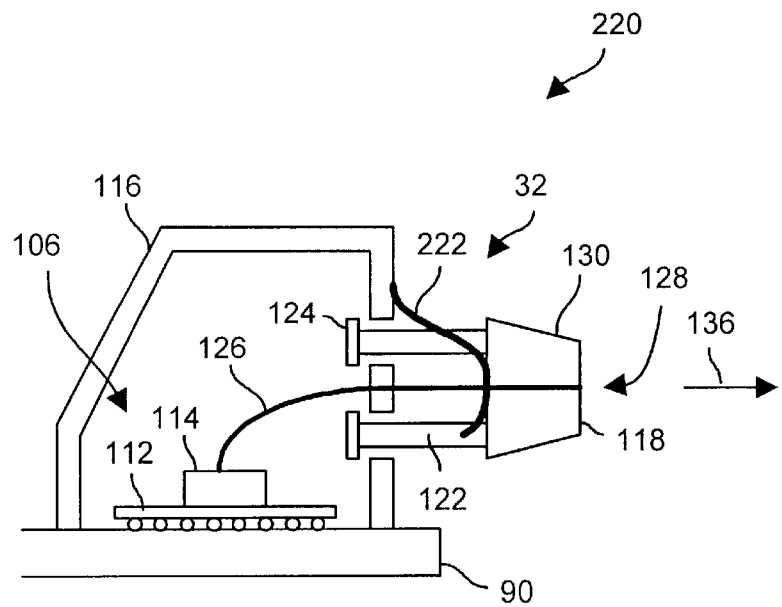
FIG. 15 is a cross-sectional view of an alternative fiber optic connector assembly which is suitable for use by the circuit board of FIG. 5.

FIG. 15 shows a cross-sectional view of a fiber optic connector assembly 220 which is a suitable alternative to the fiber optic connector assembly 110 of FIG. 5. The fiber optic connector assembly 220 is similarly mountable on the section of circuit board material 90 of the circuit board 24 of FIG. 5, and is capable of forming a fiber optic connection with a corresponding fiber optic interconnect connector 28 (see FIG. 7) of the interconnect 22 (see FIG. 1).

The connecting portion 118 of FIG. 15 is capable of moving relative to the base portion 116 in a manner similar to the connecting portion 118 of FIG. 6. In particular, the connecting portion 118 of FIG. 15 can move along a plane that is substantially perpendicular to the plane of the circuit board section 90. The connecting portion 118 of FIG. 15 can further move in a direction 136 that is substantially parallel to the plane of the circuit board section 90. However, the fiber optic connector assembly 220 of FIG. 15 includes, as a resilient member 222, a leaf spring instead of coiled springs as shown in FIG. 6. The resilient member 222 pushes the connecting portion 118 substantially in the direction 136, and is compressible when the connecting portion 118 move in a direction that is substantially opposite the direction 136. Preferably, the leaf spring is made of an elastic material such as metal or plastic and can be less costly than the more complex coiled spring arrangement of FIG. 6.

Figure 16:
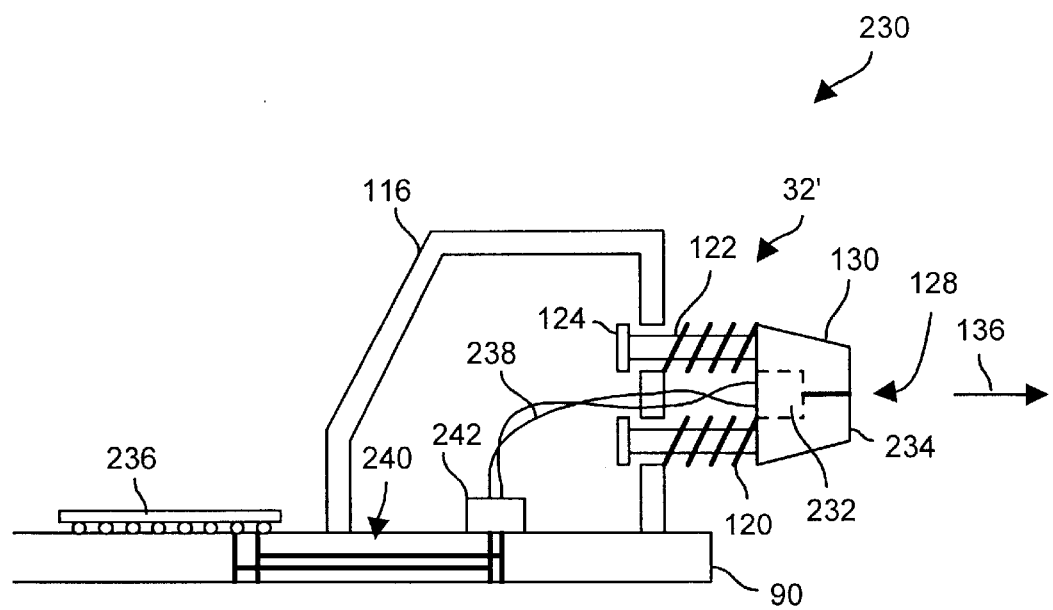
FIG. 16 is a cross-sectional view of yet another alternative fiber optic connector assembly which is suitable for use by the circuit board of FIG. 5.

FIG. 16 shows a cross-sectional view of a fiber optic connector assembly 230 which is a suitable alternative to the fiber optic connector assembly 110 of FIG. 5, and the fiber optic connector assembly 220 of FIG. 15. The fiber optic connector assembly 230 of FIG. 16 is similarly mountable on the section of circuit board material 90, and is capable of forming a fiber optic connection with a corresponding fiber optic interconnect connector 28 (see FIG. 7) of the interconnect 22 (see FIG. 1). However, in contrast to the assemblies 110, 220 of FIGS. 6 and 15, the fiber optic connector assembly 230 of FIG. 16 includes a fiber optic circuit board connector 32' having a transducer 232 housed within a connecting portion 234. The fiber optic connector assembly 230 further includes an electronic circuit 236 (e.g., a BGA device) which is housed outside the base portion 116. The electronic circuit 236 includes electronic processing circuitry, e.g., a serializer/deserializer (SERDES), 8b/10b circuitry, other logic, etc. which connects with the transducer 232 through flexible electrical conductors 238 (e.g., twisted pair wires, flex cable, etc.) and circuit board etch 240. The flexible electrical conductors 238 can be flexed and moved without concern over an extreme bend radius (a potential source of light energy loss) that exists with the other fiber optic connector assemblies 110, 220 (see FIGS. 6 and 15). Optionally, the flexible electrical conductors 238 can connect with a connector 242 mounted on the circuit board section 90, as shown in FIG. 16.

Nevertheless, it should be understood that the connecting portion 234 of FIG. 16 is capable of moving relative to the base portion 116 in a manner similar to the connecting portions 118 of FIGS. 6 and 15. In particular, the connecting portion 234 of FIG. 16 can move along a plane that is substantially perpendicular to the plane of the circuit board section 90. Additionally, the connecting portion 240 of FIG. 16 can move in a direction 136 that is substantially parallel to the plane of the circuit board section 90.

Figure 17:
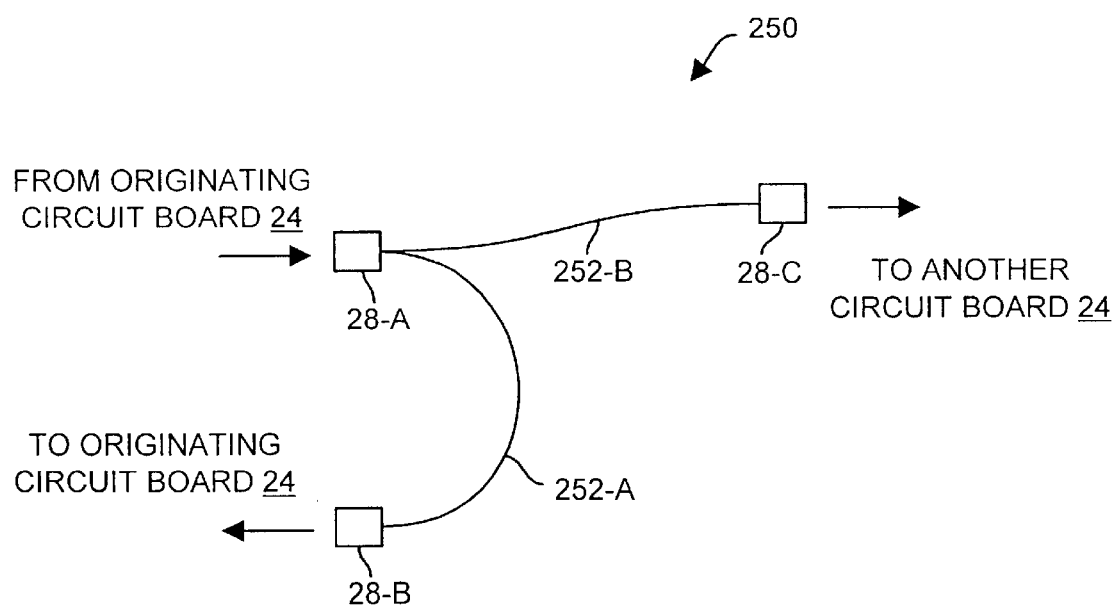
FIG. 17 is a block diagram of a fiber optic cable assembly having three connectors which is suitable for use by the invention.

FIG. 17 shows a fiber optic connecting assembly 250 which is suitable for use by the interconnect 22. In contrast to the earlier-described fiber optic connecting assembly 44 (see FIGS. 2 and 9), the fiber optic connecting assembly 250 includes more than two fiber optic connectors 28. In particular, as shown in FIG. 17, the fiber optic cable assembly 250 has three fiber optic interconnect connectors 28-A, 28-B, and 28-C. The fiber optic cable assembly 250 further includes a segment of fiber optic cable 252-A which extends between the connectors 28-A and 28-B, and another segment of fiber optic cable 252-B which extends between the connectors 28-B and 28-C. In one arrangement, the fiber optic cable assembly 250 uses a fiber that has a complete end in the connector 28-A, but that is split at the other end so that half of that end (essentially an end of a first fiber) resides in the connector 28-B, and the other half of that end (essentially an end of a second fiber) resides in the connector 28-C. Accordingly, each of the split ends (i.e., the end of each fiber) provides substantially half of the initial light energy when in operation.

The fiber optic cable assembly of FIG. 17 provides a useful tap into the communications between an originating circuit board 24 and another circuit board 24 (i.e., a destination circuit board 24). For example, the connector 28-A and 28-B can lead to the originating circuit board 24 as shown so that the originating circuit board 24 can monitor its own signal that it sends to the other circuit board 24 at the connector. 28-C. Alternatively, the connector 28-B can connect to another device (e.g., a console, a service processor, a remote device, etc.) so that the other device can receive (e.g., evaluate, monitor, etc.) the fiber optic signal.

As described above, embodiments of the invention are directed to techniques for connecting circuit boards 24 together using an interconnect 22 that provides fiber optic pathways. The interconnect 22, e.g., a fiber optic backplane, includes two planar members 42-A, 42-B and a set of fiber optic cable assemblies 44 having fiber optic connectors 28, 28' which extend through holes 62 in the planar members 42-A, 42-B. Accordingly, the circuit boards 24 can connect with the interconnect 22 (in order to communicate with each other through the interconnect 22) in a manner that enables them to easily install onto and de-install from the interconnect 22 (e.g., during initial installation, replacement, etc.). Additionally, the fiber optic cable assemblies 44 can be positioned relative to the planar members 42-A, 42-B such that there is no interference with an air stream 36 that cools the circuit boards 24, and such that there is little or no opportunity for tampering or inadvertently modifying the configuration of fiber optic pathways. The features of the invention may be employed in computer systems systems, components and methods as well as other devices and processes such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the fiber optic interconnect connectors 28, 28' were described above as being female fiber optic connectors, and that the fiber optic circuit board connectors 32, 32' were described above as being male fiber optic connectors by way of example only. Other arrangements are suitable as well. For example, the connecting portions 118, 234 of the fiber optic circuit board connectors 32, 32' can be configured as female connectors (i.e., configured to define a cavity similar to the cavity 74 of the fiber optic interconnect connector 28, 28' of FIG. 7), and the fiber optic interconnect connectors 28, 28' can be configured to as male connectors (e.g., to have ends such as those shown in FIGS. 12–14 for engaging the cavity 74).

Additionally, it should be understood that some of the steps of manufacturing the interconnect 22 are optional. For example, in connection with the procedure 140 of FIG. 8, it should be understood that it is not necessary to arrange a set of standoff members between the planar members 42-A, 42-B particularly if the connectors 28, 28' include standoff portions 92-A, 92-B which perform a similar function. The standoff portions 92-A, 92-B provide a further function of pushing the connectors 28, 28' firmly into their holes and against the planar members 42-A, 42-B for proper positioning. As another alternative, machinery can hold the planar members 42-A, 42-B in place while the medium is injected between the planar members 42-A, 42-B thus alleviating the need for standoffs all together.

Furthermore, it should be understood that the step of heating is optional (see step 152 of FIG. 8). If the medium is quick to change state (e.g., quick drying, quick setting, etc.), the use of heaters 176-A, 176-B can be avoided. In some arrangements, metal plates are used rather than the heaters 176-A, 176-B. The metal plates provide clamp pressure to offset pressure from the injected medium (e.g., pressure from expanding foam). The metal plates support the planar members 42 and keep them flat during the medium installation process.

Additionally, it should be understood that the medium can be positioned between the planar members 42-A, 42-B using techniques other than vacuum injecting. For example, if the medium initially has a low viscosity, the interconnect inner region 178 (see FIG. 11) can simply be filled with the medium without initially creating a vacuum. That is, the medium fills the interconnect inner region 178 and displaces air as it enters the region.

Furthermore, it should be understood that the connecting portions 118, 234 were described as being either trapezoidal or conical in shape by way of example only. Other shapes are suitable for use as well provided that the connector on the opposite end has a cavity with a complementary shape. Such alternative shapes include spherical shapes (e.g., one connector being concave, the other being convex), rectangular in shape, square in shape, etc.

Additionally, it should be understood that the fiber optic cable assemblies 44 were described above as having substantially the same length in order to provide the same signal delay. In another arrangement, the fiber optic cable assemblies 44 have different lengths. However, fiber optic cable assemblies 44 carrying the same types of signals (e.g., data in a bus-like manner, commands, etc.) preferably have similar lengths so that the light signals behave similarly, i.e., so that the variation in delay is minimal, so that there is similar light signal energy loss, so that there is similar reflection, and so on.

Furthermore, it should be understood that the fiber optic connectors 28, 32 can be self-aligning, as well as require alignment assistance. Suitable mechanisms for providing such alignment assistance include using alignment posts and rigid guides (e.g., guide pins).

Additionally, it should be understood that the fibers described above can be suitable for single mode or multi-mode transmissions. The fibers can be configured to carry multiple wavelengths of light simultaneously (e.g., 16 slightly different wavelengths of blue light, LED light, laser light, etc.). The receiving ends can then be configured to filter out the wavelengths and identified particular light signals within the fiber.

Furthermore, it should be understood that the interconnect 22 is suitable for use in an electronic cabinet (e.g., in a general purpose computer, in a data storage system, in a specialized computer, etc.). The interconnect 22 is also suitable for use in an exposed area such as in a rack-mount configuration. Even in an exposed area, the organization of fiber optic cable assemblies 44 stored in the interconnect 22 cannot be varied or tampered with.

Additionally, it should be understood that the planar members 42 of the interconnect 22 were shown as including six columns 26 of connectors 28, 28' by way of example only. Other numbers of columns are suitable for use as well, e.g., four, eight, 12, 16 and so on.

Furthermore, it should be understood that the planar members 42 of the interconnect 22 were shown as including five fiber optic connectors 28, 28' in each column 26 by way of example only. Other numbers of connectors 28, 28' can reside in each column 26, e.g., 12, 16, 32, 64, etc.

Additionally, it should be understood that the interconnect 22 was above described as including fiber optic cable assemblies 44 having exactly two ends (see FIGS. 2 and 9) and fiber optic assemblies 250 having exactly three ends (see FIG. 17) by way of example only. Other cable assemblies are suitable for use as well such as assemblies having more than three ends (e.g., four ends, etc).

Furthermore, it should be understood that the interconnect 22 can include standard fiber optic connectors which connect to external devices. For example, some of the fiber optic cable assemblies 44, 250 can have a standard fiber optic connector at one end, and that connector can reside along a periphery of the interconnect 22 to enable the external device to connect thereto. Accordingly, external devices can directly access signals within the interconnect 22 (e.g., for testing and debugging purposes, for diagnostics, etc). In one arrangement, such peripherally located fiber optic connectors enable expansion of the interconnect 22 so that it can join with one or more other interconnects 22, systems or networks.

Additionally, it should be understood that the layout of the circuit board 24 in FIG. 5 was provided by way of example only. Other layouts are suitable for use by the invention as well. For example, the circuit board 24 can include a different stiffener/ejector configuration than that provided by the rigid frame 102 and the handles 108-1, 108-2 (e.g., levers, brackets, threaded thumbscrews, etc.). Furthermore, the circuit board 24 can include multiple rows of fiber optic circuit board connectors 32 (e.g., one row of fiber optic circuit board connectors 32 on each side or surface of the circuit board 24 along the interconnect edge).

Furthermore, it should be understood that electrical conductors can be included in the interconnect 22. For example, etch can be installed on and/or within the planar members 42 using standard circuit board manufacturing techniques. Such electrical conductors can connect with the circuit boards 24 using standard electrical connectors. Additionally, such electrical conductors can connect across the two planar members 42 via a flexible set of electrical conductors (e.g., wires, flex cable, etc.) in a manner similar to the segment of fiber optic cable 46-B of FIG. 2.

Additionally, it should be understood that the medium between the planar members 42-A, 42-B is not necessary. In some arrangements, the interconnect inner region 178 (see FIG. 11) is left open without a medium (i.e., hollow). In these arrangements, a technician can more easily obtain access to the fiber optic cable assemblies 44, 250 (e.g., to implement a repair).

Furthermore, it should be understood that the interconnect 22 was described above as being double-sided by way of example only. In some arrangements, the interconnect 22 is not double-sided, i.e., does not have fiber optic connectors 28, 28' on both sides. Rather, in some arrangements, the interconnect 22 is single-sided. That is, in the other arrangements, the interconnect 22 has fiber optic connectors 28, 28' only on one side (i.e., on one planar member 42). Therefore, the invention should be limited only by the spirit and scope of the appended claims.

What is claimed is:

1. An electronic system, comprising:

a set of circuit boards, each of the set of circuit boards including a set of fiber optic circuit board connectors; and an interconnect having (i) a first planar member, (ii) a second planar member that is substantially parallel to the first planar member, and (iii) a set of fiber optic cable assemblies, each fiber optic cable assembly including a fiber optic cable segment, a first fiber optic interconnect connector which fastens to one end of that fiber optic cable segment and a second fiber optic interconnect connector which fastens to another end of that fiber optic cable segment; wherein each fiber optic interconnect connector extends through a hole defined by one of the first and second planar members, at least one fiber optic interconnect connector extending through a hole defined in the first.planar member, and at least one fiber optic interconnect connector extending through a hole defined in the second planar member; and wherein each fiber optic interconnect connector is configured to engage with a fiber optic circuit board connector.

2. The electronic system of claim 1 wherein each of the set of circuit boards further includes:

a section of circuit board material;

a set of integrated circuits mounted to the section of circuit board material; and a set of fiber optic transceivers mounted to the section of circuit board material and coupled to the set of fiber optic circuit board connectors, wherein the set of fiber optic transceivers are in electrical communication with the set of integrated circuits, and wherein each fiber optic circuit board connector has (i) a base portion which is rigidly disposed relative to the section of circuit board material, (ii) a connecting portion which is capable of moving relative to the section of circuit board material, and (iii) a resilient portion disposed between the base portion and the connecting portion of that fiber optic circuit board connector.

3. An interconnect, comprising:

a first planar member;

a second planar member that is substantially parallel to the first planar member; and a set of fiber optic cable assemblies, each fiber optic cable assembly including a fiber optic cable segment, a first fiber optic connector which fastens to one end of that fiber optic cable segment and a second fiber optic connector which fastens to another end of that fiber optic cable segment, wherein each fiber optic connector extends through a hole defined by one of the first and second planar members, at least one-fiber optic connector extending through a hole defined in the first planar member and at least one fiber optic connector extending through a hole defined in the second planar member.

4. The interconnect of claim 3 wherein the fiber optic cable segment of each fiber optic cable assembly of the set of fiber optic cable assemblies has a same length.

5. An interconnect, comprising:

a first planar member;

a second planar member that is substantially parallel to the first planar member; and a set of fiber optic cable assemblies, each fiber optic cable assembly including a fiber optic cable segment, a first fiber optic connector which fastens to one end of that fiber optic cable segment and a second fiber optic connector which fastens to another end of that fiber optic cable segment, wherein each fiber optic connector extends through a holes defined by one of the first and second planar members, and wherein the first and second fiber optic connectors of each fiber optic cable assembly have sides which taper toward each other in a trapezoidal manner.

6. The interconnect of claim 3, further comprising:

a set of standoffs which position the first and second planar members such that the first and second planar members are substantially parallel to each other.

7. The interconnect of claim 3 wherein each fiber optic connector defines a connecting portion and a standoff portion such that the connecting portion of that fiber optic connector contacts one of the first and second planar members and the standoff portion of that fiber optic connector contacts the other of the first and second planar members.

8. An interconnect, comprising:

a first planar member;

a second planar member that is substantially parallel to the first planar member;

a set of fiber optic cable assemblies, each fiber optic cable assembly including a fiber optic cable segment, a first fiber optic connector which fastens to one end of that fiber optic cable segment and a second fiber optic connector which fastens to another end of that fiber optic cable segment, wherein each fiber optic connector extends through a hole defined by one of the first and second planar members; and a vacuum injected medium disposed within an interconnect inner region defined by the first and second planar members, the vacuum injected medium holding the fiber optic cable segment and first and second fiber optic connectors of each fiber optic cable assembly of the set of fiber optic cable assemblies in place.

9. The interconnect of claim 3, further comprising:

a set of electrical conductors which extend along at least one of the first and second planar members.

10. An interconnect, comprising:

a first planar member;

a second planar member that is substantially parallel to the first planar member;

a set of fiber optic cable assemblies, each fiber optic cable assembly including a fiber optic cable segment, a first fiber optic connector which fastens to one end of that fiber optic cable segment and a second fiber optic connector which fastens to another end of that fiber optic cable segment, wherein each fiber optic connector extends through a hole defined by one of the first and second planar members; and a set of electrical conductors which extend along at least one of the first and second planar members, wherein the set of electrical conductors include:
  a first group of electrical conductors that extend along the first planar member;
  a second group of electrical conductors that extend along the second planar member; and
  a third group of electrical conductors that extend across the first and second planar members to connect the first and second groups of electrical conductors.

11. An interconnect, comprising:

a first planar member;

a second planar member that is substantially parallel to the first planar member;

a set of fiber optic cable assemblies, each fiber optic cable assembly including a fiber optic cable segment, a first fiber optic connector which fastens to one end of that fiber optic cable segment and a second fiber optic connector which fastens to another end of that fiber optic cable segment, wherein each fiber optic connector extends through a hole defined by one of the first and second planar members; and a fiber optic cable assembly having a first fiber optic connector, a second fiber.optic connector, a third fiber optic connector, a first fiber that extends between the first fiber optic connector and the second fiber optic connector, and a second fiber that extends between the first fiber optic connector and the third fiber optic connector.

12. The interconnect of claim 11 wherein the first fiber optic connector and the second fiber optic connector are disposed in a same column on the first planar member so that a connecting circuit board can send a fiber optic signal and monitor that fiber optic signal.

13. The interconnect of claim 11 wherein the second fiber optic connector resides along a periphery of the interconnect to enable an external device to connect to the interconnect and monitor a signal through the fiber optic cable assembly.

14. A circuit board, comprising:

a section of circuit board material;

a set of integrated circuits mounted to the section of circuit board material;

a set of fiber optic transceivers mounted to the section of circuit board material, the set of fiber optic transceivers being in electrical communication with the set of integrated circuits; and a set of fiber optic connectors coupled to the set of fiber optic transceivers, wherein each fiber optic connector has (i) a base portion which is rigidly disposed relative to.the section of circuit board material, (ii) a connecting portion which is capable of moving relative to the section of circuit board material, and (iii) a resilient portion disposed between the base portion and the connecting portion of that fiber optic connector, wherein the connecting portion of each fiber optic connector has sides which taper toward each other in a trapezoidal manner.

15. The circuit board of claim 14 wherein the resilient portion of each fiber optic connector includes a spring that (i) permits the connecting portion of that fiber optic connector to move along a plane which is substantially perpendicular to the section of circuit board material, and (ii) provides a force on the connecting portion of that fiber optic connector in a direction that is substantially parallel to the section of circuit board material.

16. The circuit board of claim 14 wherein each fiber optic transceiver of the set of fiber optic transceivers includes a transducer that is movable relative to the section of circuit board material, and wherein the connecting portion of each of the set of fiber optic connectors supports the transducer of one of the fiber optic transceivers.

17. A method for making an interconnect, the method comprising the steps of:

positioning a first planar member and a second planer member so that the first and second planar members (i) are adjacent to each other and (ii) reside in substantially the same plane;

providing a set of fiber optic cable assemblies and installing the set of fiber optic cable assemblies into the first and second planar members, each fiber optic cable assembly including a fiber optic cable segment, a first fiber optic connector which fastens to one end of that fiber optic cable segment and a second fiber optic connector which fastens to another end of that fiber optic cable segment, the set of fiber optic cable assemblies being installed such that each fiber optic connector extends through a hole defined by one of the first and second planar members, wherein the step of providing and installing includes the step of:
  supplying the set of fiber optic cable assemblies such that the first and second fiber optic connectors of each fiber optic cable assembly have sides which taper toward each other in a trapezoidal manner; and after the step of providing and installing, folding the first and second planar members together so that the first and second planar members are substantially parallel to each other.

18. The method of claim 17 wherein the step of providing and installing includes the step of:

supplying the set of fiber optic cable assemblies such that the fiber optic cable segment of each fiber optic cable assembly of the set of fiber optic cable assemblies has a same length.

19. The method of claim 17, further comprising the step of:

arranging a set of standoffs between the first and second planar members such that the first and second planar members are substantially parallel to each other when the first and second planar members are folded together.

20. The method of claim 17 wherein each fiber optic connector defines a connecting portion and a standoff portion, and wherein the step of providing and installing includes the step of:

arranging the connecting portion and the standoff portion of each fiber optic connector such that the connecting portion of that fiber optic connector contacts one of the first and second planar members and the standoff portion of that fiber optic connector contacts the other of the first and second planar members when the first and second planar members are folded together.

21. The method of claim 17, further comprising the step of:
vacuum injecting a medium into an interconnect inner region which is defined by the first and second planar members when the first and second planar members are folded together.

22. The method of claim 21 wherein the medium resides in a liquid state when the medium is vacuum injected into the interconnect inner region defined by the first and second planar members, and wherein the method further comprises:
after the step of vacuum injecting, heating the medium to transition the medium from the liquid state to a solid state such that the medium holds the fiber optic cable segment and first and second fiber optic connectors of each fiber optic cable assembly of the set of fiber optic cable assemblies in place.

23. The method of claim 17, further comprising the step of:
providing a set of electrical conductors which extend along at least one of the first and second planar members.

24. The method of claim 17, further comprising the step of:
providing, as the first and second planar members, first and second rigid panels which include silicon-based material.

25. A fiber optic connector, comprising:
a cable receiving portion that receives a fiber of a segment of fiber optic cable; and
a connecting portion that is capable of engaging with another fiber optic connector, wherein the connecting portion and the cable receiving portion form a unitary body that defines a set of detents for installing the fiber optic connector within a hole defined by a rigid planar member, and wherein the connecting portion defines sides which taper toward each other in a trapezoidal manner.

26. The fiber optic connector of claim 25, further comprising:
a standoff portion that extends from the cable receiving portion in a direction that is opposite the connecting portion such that, when the fiber optic connector is installed within the hole defined by the rigid planar member, the standoff portion is capable of supporting the rigid planar member relative to another rigid planar member.

27. A fiber optic cable assembly, comprising:
a segment of fiber optic cable;
a first fiber optic connector that fastens to one end of the segment of fiber optic cable; and
a second fiber optic connector that fastens to another end of the segment of fiber optic cable, wherein each of the first and second fiber optic connectors includes:
a cable receiving portion that receives a fiber of the segment of fiber optic cable, and
a connecting portion that is capable of engaging with another fiber optic connector, wherein the connecting portion and the cable receiving portion form a unitary body that defines a set of detents for installing that fiber optic connector within a hole defined by a rigid planar member, and wherein the connecting portion defines sides which taper toward each other in a trapezoidal manner.

28. The fiber optic cable assembly of claim 27 wherein each of the first and second fiber optic connectors further includes:

a standoff portion that extends from the cable receiving portion of that fiber optic connector in a direction that is opposite the connecting portion of that fiber optic connector such that, when that fiber optic connector is installed within a hole defined by the rigid planar member, the standoff portion is capable of supporting the rigid planar member relative to another rigid planar member.

29. A fiber optic connector assembly, comprising:
a base portion that mounts to a circuit board;
a connecting portion that is capable of moving relative to the base portion and engaging with a fiber optic connector, wherein the connecting portion has sides which taper toward each other in a trapezoidal manner; and
a resilient portion disposed between the base portion and the connecting portion.

30. The fiber optic connector assembly of claim 29 wherein the resilient portion includes a spring that, when the fiber optic connector assembly mounts to a circuit board, (i) permits the connecting portion to move along a plane which is substantially perpendicular to the circuit board, and (ii) provides a force on the connecting portion in a direction that is substantially parallel to the circuit board.

31. The fiber optic connector assembly of claim 29, further comprising:
a fiber optic transceiver having a transducer that is supported by the connecting portion and movable relative to the base portion.

32. The electronic system of claim 1 wherein the set of circuit boards includes:
a first group of circuit boards which, when connecting to the interconnect, extends from the first planar member of the interconnect in a first direction; and
a second group of circuit boards which, when connecting to the interconnect, extends from the second planar member of the interconnect in a second direction that is substantially opposite the first direction.

33. The interconnect of claim 3 wherein a first group of fiber optic connectors and the first planar member form a first interconnect interface which is configured to connect to a first group of circuit boards which, when connecting to the first interconnect interface, extends from the first planar member in a first direction; and wherein a second group of fiber optic connectors and the second planar member form a second interconnect interface which is configured to connect to a second group of circuit boards which, when connecting to the second interconnect interface, extends from the second planar member in a second direction that is substantially opposite the first direction.

34. The electronic system of claim 1 wherein each fiber optic interconnect connector, which extends through a hole defined in the first planar member, directs a fiber optic interface in a first direction; and wherein each fiber optic interconnect connector, which extends through a hole defined in the second planar member, directs a fiber optic interface in a second direction that is substantially opposite the first direction.

35. The interconnect of claim 3 wherein each fiber optic connector, which extends through a hole defined in the first planar member, directs a fiber optic interface in a first direction; and wherein each fiber optic connector, which extends through a hole defined in the second planar member, directs a fiber optic interface in a second direction that is substantially opposite the first direction.

* * * * *

UNITED STATES PATENT AND TRADEMARK OFFICE
CERTIFICATE OF CORRECTION

PATENT NO. : 6,623,177 B1  Page 1 of 1
DATED : September 23, 2003
INVENTOR(S) : Kendell A. Chilton It is certified that error appears in the above-identified patent and that said Letters Patent is hereby corrected as shown below:

<u>Column 18,</u>
Line 15, "planar member and" should read -- planar member, and --.
Line 31, "through a holes" should read -- through a hole --.

<u>Column 19,</u>
Line 37, "second fiber.optic" should read -- second fiber optic --.
Line 64, "to.the section" should read -- to the section --.

Signed and Sealed this

Thirtieth Day of December, 2003

JAMES E. ROGAN
*Director of the United States Patent and Trademark Office*